United States Patent
Jones et al.

(10) Patent No.: US 11,395,541 B2
(45) Date of Patent: *Jul. 26, 2022

(54) CONNECTION OF A SUPPORT TO A MOLDED PLASTIC STRUCTURE

(71) Applicant: LIFETIME PRODUCTS, INC., Clearfield, UT (US)

(72) Inventors: Scott Jones, Clearfield, UT (US); Charles Monsen, Clearfield, UT (US); Kevin Boydston, Clearfield, UT (US); Frank M. Clegg, Clearfield, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,970

(22) Filed: Jan. 25, 2021

(65) Prior Publication Data

US 2021/0137261 A1    May 13, 2021

Related U.S. Application Data

(63) Continuation of application No. 16/778,717, filed on Jan. 31, 2020, now Pat. No. 11,266,230, and a (Continued)

(51) Int. Cl.
  *A47B 7/00* (2006.01)
  *A47B 13/00* (2006.01)
  *A47B 13/02* (2006.01)

(52) U.S. Cl.
  CPC .............. *A47B 7/00* (2013.01); *A47B 13/003* (2013.01); *A47B 13/02* (2013.01);
  (Continued)

(58) Field of Classification Search
  CPC ....... A47B 3/0912; A47B 3/087; A47B 3/091; A47B 7/00; A47B 2230/16; A47B 2200/001; A47B 2220/008
  (Continued)

(56) References Cited

U.S. PATENT DOCUMENTS 6,530,331 B2    3/2003  Stanford
6,832,563 B2    12/2004 Stanford
(Continued)

FOREIGN PATENT DOCUMENTS

CN    1638675 A    7/2005
CN    103298702 B    9/2013
(Continued)

OTHER PUBLICATIONS

KR2003071898, Park, Abstract and Figure (Year: 2003).
(Continued)

*Primary Examiner* — Janet M Wilkens
(74) *Attorney, Agent, or Firm* — Maschoff Brennan

(57) ABSTRACT

A blow-molded plastic structure, such as a tabletop, may include an undercut. For example, the tabletop may include a frame receiving portion and a frame connecting structure with an undercut may be disposed in the frame receiving portion. A portion of the frame may contact or engage the frame connecting structure, such as the undercut, when the frame is connected to the tabletop. In an exemplary embodiment, a first side of the frame receiving portion may include a first frame connecting portion with an undercut and a second side of the frame receiving portion may include a second frame connecting portion with an undercut. The first frame connecting portion with an undercut may be disposed on an opposing surface from the second frame connecting portion with an undercut.

20 Claims, 15 Drawing Sheets

US 11,395,541 B2
Page 2

Related U.S. Application Data continuation of application No. 16/776,385, filed on Jan. 29, 2020, now Pat. No. 11,147,365.

(60) Provisional application No. 62/800,318, filed on Feb. 1, 2019.

(52) U.S. Cl.
CPC . *A47B 2200/001* (2013.01); *A47B 2200/0011* (2013.01); *A47B 2220/008* (2013.01); *A47B 2230/16* (2013.01)

(58) Field of Classification Search
USPC .. 108/901, 151, 129–133, 902, 155, 157.16, 108/27, 161
See application file for complete search history.

(56) References Cited

U.S. PATENT DOCUMENTS

| | | |
|---|---|---|
| 6,912,961 B2 | 7/2005 | Winter et al. |
| 6,931,999 B2 | 8/2005 | Stanford |
| 6,968,789 B2 | 11/2005 | Baik et al. |
| 7,051,662 B2 | 5/2006 | Shenghao et al. |
| 7,059,254 B2 | 6/2006 | Strong et al. |
| 7,096,799 B2 | 8/2006 | Strong et al. |
| 7,111,563 B2 | 9/2006 | Strong |
| 7,171,910 B2 | 2/2007 | Neunzert et al. |
| 7,178,471 B2 | 2/2007 | Strong et al. |
| 7,263,932 B2 | 9/2007 | Winter et al. |
| 7,278,361 B2 | 10/2007 | Zhurong et al. |
| 7,299,754 B2 | 11/2007 | Stanford et al. |
| 7,331,297 B2 | 2/2008 | Strong et al. |
| 7,469,646 B2 | 12/2008 | Baik et al. |
| 7,475,642 B2 | 1/2009 | Shenghao et al. |
| 7,475,643 B2 | 1/2009 | Haney et al. |
| 7,475,644 B2 | 1/2009 | Strong et al. |
| 7,578,244 B2 | 8/2009 | Williams, Jr. |
| 7,640,870 B2 | 1/2010 | Strong et al. |
| 7,644,667 B2 | 1/2010 | Strong et al. |
| D619,831 S | 7/2010 | Branch |
| 7,905,185 B2 | 3/2011 | Peery et al. |
| D640,487 S | 6/2011 | Bennett |
| 7,971,930 B2 | 7/2011 | Larsen et al. |
| 8,006,630 B2 | 8/2011 | Strong et al. |
| 8,033,228 B2 | 10/2011 | Haney et al. |
| 8,156,875 B2 | 4/2012 | Neunzert et al. |
| D658,912 S | 5/2012 | Winter et al. |
| D659,450 S | 5/2012 | Winter et al. |
| 8,166,894 B1 | 5/2012 | Branch et al. |
| D662,736 S | 7/2012 | Peery et al. |
| D662,738 S | 7/2012 | Winter et al. |
| D667,659 S | 9/2012 | Winter et al. |
| D668,483 S | 10/2012 | Bennett |
| 8,302,541 B2 | 11/2012 | Haney et al. |
| D671,773 S | 12/2012 | Johnson et al. |
| D671,775 S | 12/2012 | Clegg et al. |
| D671,776 S | 12/2012 | Clegg et al. |
| D672,175 S | 12/2012 | Peery et al. |
| 8,342,107 B2 | 1/2013 | Mower et al. |
| 8,347,795 B2 | 1/2013 | Peery et al. |
| 8,397,652 B2 | 3/2013 | Peery et al. |
| 8,397,653 B2 | 3/2013 | Ashby et al. |
| 8,408,146 B2 | 4/2013 | Peery et al. |
| D681,982 S | 5/2013 | Clegg et al. |
| D682,586 S | 5/2013 | Clegg et al. |
| D683,985 S | 6/2013 | Nye et al. |
| D688,496 S | 8/2013 | Bennett |
| 8,534,205 B1 | 9/2013 | Johnson et al. |
| 8,544,393 B2 | 10/2013 | Branch et al. |
| 8,555,789 B2 | 10/2013 | Jin et al. |
| 8,555,790 B2 | 10/2013 | Winter et al. |
| 8,555,791 B2 | 10/2013 | Jin et al. |
| 8,567,322 B2 | 10/2013 | Trimble et al. |
| 8,578,863 B2 | 11/2013 | Peery et al. |
| 8,578,865 B2 | 11/2013 | Haney et al. |
| D696,882 S | 1/2014 | Clegg et al. |
| 8,622,007 B2 | 1/2014 | Peery et al. |
| D700,465 S | 3/2014 | Johnson et al. |
| 8,683,929 B2 | 4/2014 | Peery et al. |
| 8,720,990 B2 | 5/2014 | Boydston |
| 8,721,003 B2 | 5/2014 | Waite et al. |
| 8,726,817 B2 | 5/2014 | Bennett et al. |
| 8,746,155 B2 | 6/2014 | Haney et al. |
| 8,757,069 B2 | 6/2014 | Peery et al. |
| D708,462 S | 7/2014 | Nye et al. |
| D715,081 S | 10/2014 | Bennett |
| 8,857,349 B2 | 10/2014 | Peery et al. |
| 8,904,943 B2 | 12/2014 | Jin et al. |
| 8,943,982 B2 | 2/2015 | Peery et al. |
| D727,074 S | 4/2015 | Johnson et al. |
| 8,997,663 B2 | 4/2015 | Peery et al. |
| D734,081 S | 7/2015 | Johnson et al. |
| 9,101,209 B2 | 8/2015 | Bennett et al. |
| D739,672 S | 9/2015 | Johnson et al. |
| 9,138,050 B2 | 9/2015 | Peery et al. |
| 9,173,482 B2 | 11/2015 | Peery et al. |
| 9,192,229 B2 | 11/2015 | Peery et al. |
| 9,192,230 B2 | 11/2015 | Clegg et al. |
| D748,418 S | 2/2016 | Johnson et al. |
| 9,277,808 B2 | 3/2016 | Cai et al. |
| 9,307,831 B2 | 4/2016 | Peery et al. |
| 9,351,563 B2 | 5/2016 | Bennett et al. |
| D759,411 S | 6/2016 | Johnson et al. |
| 9,486,076 B2 | 11/2016 | Peery et al. |
| 9,532,644 B2 | 1/2017 | Nye et al. |
| 9,549,612 B2 | 1/2017 | Peery et al. |
| 9,591,918 B2 | 3/2017 | Nye et al. |
| 9,642,459 B2 | 5/2017 | Peery et al. |
| 9,661,916 B2 | 5/2017 | Peery et al. |
| 9,730,514 B2 | 8/2017 | Peery |
| 9,763,513 B2 | 9/2017 | Cai et al. |
| 9,763,517 B2 | 9/2017 | Peery et al. |
| 9,848,699 B2 | 12/2017 | Peery et al. |
| 10,092,091 B1 | 10/2018 | Wang et al. |
| D863,853 S | 10/2019 | Johnson et al. |
| D864,637 S | 10/2019 | Johnson et al. |
| 2003/0217676 A1 | 11/2003 | Strong et al. |
| 2003/0230219 A1 | 12/2003 | Strong et al. |
| 2005/0005826 A1 | 1/2005 | Strong et al. |
| 2005/0011422 A1 | 1/2005 | Wen |
| 2005/0045074 A1 | 3/2005 | Jin |
| 2005/0066862 A1 | 3/2005 | Choi et al. |
| 2005/0097714 A1 | 5/2005 | Lipniarski |
| 2005/0155531 A1 | 7/2005 | Chang |
| 2005/0160950 A1 | 7/2005 | Haney et al. |
| 2012/0266787 A1 | 10/2012 | Peery et al. |
| 2012/0266788 A1 | 10/2012 | Peery et al. |
| 2012/0266789 A1 | 10/2012 | Peery et al. |
| 2016/0051049 A1 | 2/2016 | Peery et al. |
| 2017/0238698 A1 | 8/2017 | Nye et al. |
| 2018/0064251 A1 | 3/2018 | Thuma et al. |
| 2020/0214440 A1 | 7/2020 | Johnson et al. |
| 2020/0245755 A1 | 8/2020 | Jones et al. |
| 2020/0245757 A1 | 8/2020 | Jones et al. |
| 2021/0137261 A1 | 5/2021 | Jones |

FOREIGN PATENT DOCUMENTS

| | | |
|---|---|---|
| CN | 108158209 A | 6/2018 |
| JP | S64-216218 U | 2/1989 |
| JP | H09314647 A | 12/1997 |

OTHER PUBLICATIONS

U.S. Appl. No. 16/776,385, filed Jan. 29, 2020.
U.S. Appl. No. 16/778,717, filed Jan. 31, 2020.
International Search Report and Written Opinion, as issued in connection with International Patent Application No. PCT/US2020/016296, dated Dec. 4, 2020.
International Search Report and Written opinion, as issued in connection with International Patent Application No. PCT/US2020/016296, dated May 26, 2020.

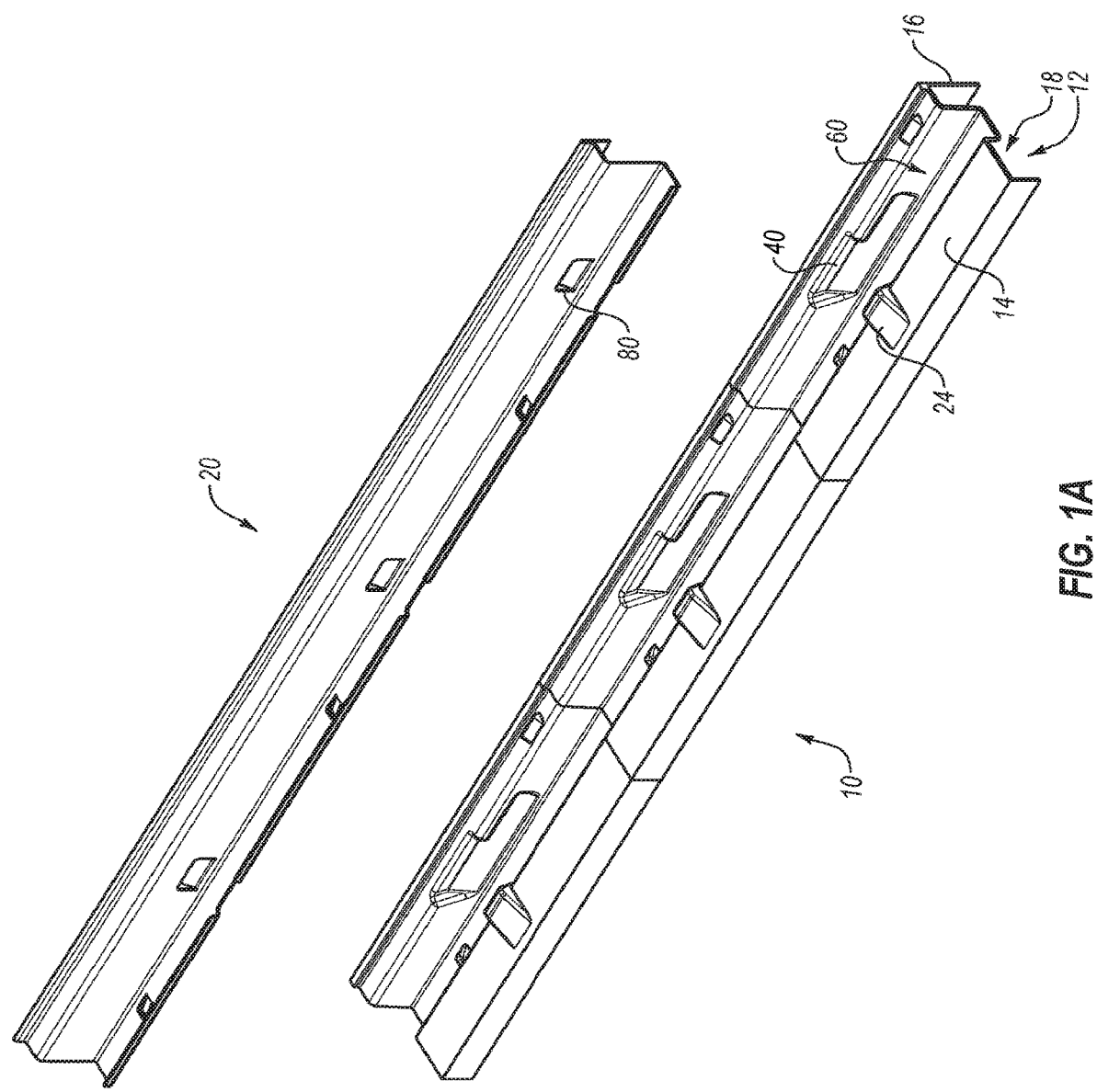

CONNECTION OF A SUPPORT TO A MOLDED PLASTIC STRUCTURE

CROSS-REFERENCE TO RELATED APPLICATIONS

This application is a continuation of U.S. patent application Ser. No. 16/776,385, filed Jan. 29, 2020, which claims priority to and the benefit of U.S. Provisional Patent Application Ser. No. 62/800,318, filed Feb. 1, 2019.

This application is a continuation of U.S. patent application Ser. No. 16/778,717, filed Jan. 31, 2020, which claims priority to and the benefit of U.S. Provisional Patent Application Ser. No. 62/800,318, filed Feb. 1, 2019.

Each of these applications and patents are hereby incorporated by reference in its entirety.

BACKGROUND

Field of the Invention

The present invention generally relates to structures that are at least partially constructed from blow-molded plastic and, more particularly, to blow-molded plastic structures including an undercut.

Description of Related Art

Blow-molding is a manufacturing process by which hollow plastic parts are formed. The blow-molding process typically begins with a hollow tube of molten plastic, which is commonly referred to as a parison. The parison is clamped into a mold and air is blown into the parison. The air pressure pushes the plastic into the faces of the mold so that the plastic takes the shapes of the mold. Once the plastic has cooled, the mold may be opened and the part may be ejected from the mold.

In greater detail, conventional blow-molding machines include a mold with two halves and the blow-molding process is initiated with the two mold halves spaced apart. The parison or tube of molten plastic is extruded between the mold halves and then the mold halves are moved horizontally toward one another. The parison, which is disposed within the mold, is inflated with pressured air, which is typically between about 60 psi and about 150 psi. The parison expands into contact with the inner surfaces of the molds, and the plastic is formed into the desired shape. Thereafter, the air pressure is reduced and the mold halves are separated to allow the blow-molded plastic article to be removed.

The blow-molding process is typically used to create hollow plastic structures such as bottles and containers. The blow-molding process may allow hollow plastic objects to be manufactured economically and in high volume. In addition, the blow-molding process may allow thin-walled objects to be quickly manufactured. Because blow-molded structures include a hollow interior portion and each mold half forms its own wall shape, a variety of different types of structures can be constructed using the blow-molding process.

The type and configuration of blow-molded plastic objects that may be formed, however, may be limited by the hollow interior portion. The type and configuration of blow-molded plastic objects that may be formed may also be limited because pressurized air is required to stretch and push the plastic into the faces of the mold during the molding process. In addition, the outer wall thickness of a blow-molded plastic structure may be difficult to control because, as the object being manufactured is larger in size, the more the plastic may have to be stretched and stressed during the molding process.

BRIEF SUMMARY

A need therefore exists for a blow-molded plastic structure, a process for making blow-molded plastic structure, and/or a method of making a blow-molded plastic structure that eliminates or diminishes the above-described disadvantages and problems.

One aspect is a structure that may be constructed from plastic. For example, the structure may be constructed from molded plastic. If desired, the structure may be constructed from blow-molded plastic.

Another aspect is the structure that may be constructed from blow-molded plastic. The blow-molded plastic structure may be an article of furniture, such as a table or chair, water sports equipment, such as a kayak or paddleboard, a container, such as a bottle or cooler, an enclosure, such as a shed or deck box, and the like. The structure could also be component or part of a structure, such as a tabletop, chair seat, chair back, a component of a kayak, a component of a paddleboard, a component of a cooler, a component of a shed, a component of playground equipment, and the like. Additionally, the structure could be other suitable objects, articles, constructions, and the like, such as panels, sections, segments, and the like.

Still another aspect is a method or process of manufacturing or making a blow-molded plastic structure. The method may include forming a blow-molded plastic structure with one or more features or attributes. The process of manufacturing or making may include forming a blow-molded plastic structure with one or more features or attributes.

Yet another aspect is a blow-molded plastic structure with an undercut that is formed during the blow-molding process. The undercut may include an overhang without material on the underside of the overhang. The undercut may be formed during the molding process without any cutting away or removal of material. Thus, for example, an undercut may be formed during the molding process without requiring material to be cutaway or removed.

Still yet another aspect is a blow-molded plastic structure with an undercut that is formed during the molding process. The undercut may be formed during the blow-molding process by one or more tools and the undercut may include an overhanging structure and a relief or receiving portion disposed under the overhang. Thus, in an exemplary embodiment, the undercut may include a projection or outcropping and an open space under the projection. Because the open space may be formed during the molding process, no cutting or removal of material may be required.

A further aspect is a blow-molded plastic structure with an undercut that is formed during the molding process with a movable tool. The tool may allow the undercut to be formed with sharp edges and/or acute angles. For example, the blow-molded plastic structure may include an undercut with a surface disposed at an angle of about sixty degrees (60°) or more, about sixty-five degrees (65°) or more, about seventy degrees (70°) or more, about seventy-five degrees (75°) or more, about eighty degrees (80°) or more, about eighty-five degrees (85°) or more, or about ninety degrees (90°) or more relative to the blow-molded plastic structure. For instance, a portion of the undercut may be disposed at a sharp or acute angle relative to a surface of the blow-molded plastic structure and the acute angle may be an angle of about sixty degrees (60°) or more, about sixty-five degrees (65°) or more, about seventy degrees (70°) or more, about seventy-five degrees (75°) or more, about eighty degrees (80°) or more, about eighty-five degrees (85°) or more, or about ninety degrees (90°) or more. The undercut may be formed in such a way that the undercut is not substantially deformed or distorted when the structure is removed from the mold during the blow-molding process. Thus, in an exemplary embodiment, an undercut may be formed during the blow-molding process, the undercut may be formed with an acute angle, the undercut may be formed without the removal of any material, and the undercut may not be substantially deformed or distorted when the structure is removed from the mold during the blow-molding process.

Another further aspect is an undercut that may be formed during a blow-molding process and the undercut may be formed by a movable tool during the molding process. For example, a structure may be formed during the blow-molding process and the structure may include one or more undercuts formed during the blow-molding process. The undercuts may be formed by a tool, which may be movable during the molding process, and the undercuts may include one or more acute angles. In addition, the undercuts may be formed without the removal of material and the undercuts may not be significantly deformed when the structure is removed from the mold. Advantageously, the acute angles may provide sharp corners, abrupt transitions, clearly defined overhangs, clearly defined reliefs or recesses disposed under the overhangs, etc. The undercuts may facilitate attachment of items or objects to the blow-molded plastic structure.

A still further aspect is a blow-molded plastic structure may include an undercut formed during the blow-molding process. The undercut may be disposed in a surface of the blow-molded plastic structure and the surface of the blow-molded plastic structure may include a generally planar, flat, or level portion. The undercut may include a protrusion extending from the generally planar portion with a relief or recess disposed underneath the protrusion. For example, an undercut may be disposed in the wall or surface of the blow-molded plastic structure. The undercut may include a protrusion extending outwardly relative to the generally planar surface of the blow-molded plastic structure and a recess may be disposed underneath the protrusion. The lower surface of the protrusion may be disposed at a sharp or acute angle relative to the generally planar portion of the blow-molded plastic structure. The lower surface of the protrusion may also be disposed at a sharp or acute angle relative to a distal end of the protrusion.

Yet another further aspect is a blow-molded plastic structure that may include a generally planar wall or surface with an undercut. The blow-molded plastic structure may also include one or more generally planar walls or surfaces and one or more undercuts may be formed in the walls or surfaces. For instance, a first undercut may be disposed on a first wall or surface and a second undercut may be disposed on a second wall or surface. The walls or surfaces may have generally parallel, symmetrical, or similar configurations. The undercuts may be generally aligned or spaced apart depending, for example, upon the intended use of the structure.

Advantageously, the undercuts may allow an object to be securely connected to the blow-molded plastic structure. For example, the undercut may allow a part or component to be securely connected to the blow-molded plastic structure. The undercut may also facilitate connection of another object or article to the blow-molded plastic structure. For instance, the undercut may facilitate connection of a frame to a blow-molded plastic structure. In particular, the undercut may facilitate connection of a frame to a blow-molded plastic tabletop.

In greater detail, the undercut may beneficially allow another article to be securely connected to a blow-molded plastic structure. For example, the undercut may engage a portion of frame and the engagement of the frame with the undercut may help create a secure connection. In addition, the engagement of the frame with the undercut may help prevent unintentional removal of the frame. Further, the undercut may be angled and, depending upon the angle of the undercut, a force applied to the frame may result in more secure connection of the frame to the blow-molded plastic structure. After reviewing this disclosure, one skilled in the art will appreciate that the undercut may have different shapes, sizes, configurations, and arrangements depending, for example, upon the intended use of the structure. In addition, after reviewing this disclosure one skilled in the art will appreciate that the angle of the undercut may be sharp or acute, and the undercut may include one or more angled surfaces.

Another aspect is a blow-molded plastic structure, such as a tabletop, with an undercut disposed in a lower surface or portion of the tabletop. The undercut may allow a frame to be securely connected to the tabletop. For example, the tabletop may include a frame receiving portion and the frame receiving portion may include one or more undercuts. In an exemplary embodiment, the frame receiving portion may include one or more surfaces and one or more undercuts may be disposed in one or more of the surfaces. For instance, a first undercut may be disposed in a first surface of the frame receiving portion and a second undercut may be disposed in a second surface of the frame receiving portion. The undercuts may be sized and configured to allow the frame to be inserted into the frame receiving portion and then moved so that the frame and undercuts at least partially engage. The engagement of the frame and the undercuts may help securely attach the frame and the tabletop. In greater detail, the frame may include one or more cutouts and the frame may be disposed in the frame receiving portion. In an exemplary embodiment, the cutouts may allow the frame to be inserted into the frame receiving portion. The frame may then be moved so that the frame and the undercuts engage. For example, one or more portions of the frame may engage one or more undercuts, or one or more portions of one or more undercuts. In addition, the frame may include one or more engagement surfaces and the engagement surfaces may engage one or more of the cutouts. The frame may also include one or more engagement portions that are sized and configured to be disposed in receiving portions, which may facilitate attachment of the frame and the tabletop. When the engaging or engagement portions are disposed in the receiving portions, that may help prevent unintentional movement of the frame relative to the tabletop.

Still another aspect is a blow-molded structure, such as a tabletop, that may include an undercut that is integrally formed during a molding process as part of a unitary, one-piece construction. The unitary, one-piece, blow-molded plastic structure with an undercut may allow a frame to be securely connected to the tabletop. One skilled in the art, after reviewing this disclosure, will appreciate that the blow-molded plastic tabletop and/or frame may have a variety of different shapes, sizes, configurations, and arrangements depending, for example, upon the intended use of the table. Additionally, one skilled in the art, after reviewing this disclosure, will appreciate that the blow-molded plastic tabletop with an undercut may have a variety of different features, aspects, characteristics, and the like.

Yet another aspect is a blow-molded plastic structure, such as a tabletop, that may include a receiving portion with an undercut. The receiving portion may be sized and configured to receive a structure such as a frame and the undercut may facilitate attachment of the frame to the tabletop. The frame receiving portion may be disposed in the lower surface of a tabletop and the frame receiving portion with one or more undercuts may allow a frame to be securely connected to the tabletop. The frame receiving portion with one or more cutouts may eliminate the need for fasteners to connect the frame to the tabletop. Advantageously, eliminating or decreasing the need for fasteners to attach the frame to the tabletop may reduce costs and expedite the manufacturing process.

Still yet another aspect is a blow-molded plastic structure, such as a tabletop, that may include an undercut that is disposed at an angle. For example, in an exemplary embodiment, the undercut may include a surface that is disposed generally parallel to or at an angle relative to a lower surface of the tabletop and/or an upper surface of the tabletop. In another exemplary embodiment, the undercut may include a surface that is disposed generally perpendicular to or at an angle relative to a surface of the tabletop. In still another exemplary embodiment, the undercut may include a surface that is disposed at an angle relative to a generally planar surface of the tabletop. For example, the undercut may include a surface that is disposed generally perpendicular to a generally planar surface of the tabletop.

A further aspect is a blow-molded plastic structure, such as a tabletop, that may include an undercut with a generally planar surface. For example, the lower portion of the undercut may be a generally planar surface. The generally planar surface of the undercut may be disposed generally parallel to or at an angle relative to a lower surface of the tabletop and/or an upper surface of the tabletop. The generally planar surface of the undercut may also be disposed generally perpendicular to or at an angle relative to a surface of the tabletop. The generally planar surface of the undercut may further be disposed at an angle that is generally perpendicular to a generally planar surface of the tabletop.

Another further aspect is a blow-molded plastic structure that may include an undercut with a surface that is disposed generally perpendicular or at an angle relative to a wall of the blow-molded plastic structure. For example, the surface of the undercut may be disposed at an acute angle relative to the wall. The undercut may also include a surface that is disposed at an angle of about ninety degrees (90°) or more relative to the wall, about eighty degrees (80°) or more relative to the wall, about seventy degrees (70°) or more relative to the wall, about sixty degrees (60°) or more relative to the wall, or about fifty degrees (50°) or more relative to the wall. The angle of the surface of the undercut may be measured, for example, relative to the wall of the blow-molded plastic structure and a lower portion of the undercut.

A still further aspect is blow-molded plastic structure that may include an undercut with an angled surface. The angled surface of the undercut may facilitate secure engagement of another object to the blow-molded plastic structure. For instance, the undercut may include angled surface that is disposed upwardly at an angle of about two degrees (2°) or more, about four degrees (4°) or more, about six degrees (6°) or more, about eight degrees (8°) or more, about ten degrees (10°) or more. It will be appreciated that the angle of the surface of the undercut may impact the ease at which an object may be attached or disconnected from the structure. It will also be appreciated that the angle of the surface of the undercut may be disposed at other suitable angles depending, for example, upon the intended use of the structure. It will be further appreciated that the undercut may have other suitable shapes, sizes, configurations, and/or arrangements depending, for example, upon the intended use of the structure.

Yet another further aspect is a blow-molded plastic structure that may include an undercut with a surface disposed at a sharp angle. For example, the undercut may include an edge, corner, or transition that is sharp or abrupt. The transition may be disposed at an angle of about ninety degrees (90°) or more, about eighty degrees (80°) or more, about seventy degrees (70°) or more, about sixty degrees (60°) or more, or about fifty degrees (50°) or more. The distinct edge or transition of the undercut may facilitate attachment of another object to the blow-molded plastic structure. In addition, the undercut may have a relatively large receiving portion disposed under the overhang. The undercut may also provide a relatively large area of contact or engagement, which may further facilitate attachment of another object to the blow-molded plastic structure. The large receiving portion, the large surface area, and/or the sharp angle or transition may facilitate secure connection of another object to the blow-molded plastic structure.

Another aspect is a method of forming an undercut in a blow-molded plastic structure. The method may include forming a protrusion with an undercut in a surface of a blow-molded plastic structure. For example, a first undercut may be disposed on a first side of a frame receiving portion and a second undercut may be disposed on a second side of the frame receiving portion. The undercut may be formed by a tool with a base and one or more fingers. The fingers may be movable or slidable relative to the base and the base may include a guide, which may help control movement of the fingers. The fingers may be disposed at an angle and the guide may include a generally wedge-shaped portion disposed between the fingers. The distal ends of the fingers may include outwardly extending portions and the outwardly extending portions may be used to form the undercuts. In a molding position, the distal ends of the fingers may be disposed a first distance away from the base of the tool and the outermost portions of the outwardly extending portions of the fingers may be spaced a first distance apart. When the blow-molded plastic structure is formed, plastic may envelop or encircle the ends of the fingers and/or a portion of the guide, such as the wedge-shaped structure. After the inwardly extending portion with the undercuts is formed, the blow-molded plastic structure may be moved away from the face of the mold and the fingers may move inwardly and at an angle relative to the face of the mold. When the blow-molded plastic structure has moved a distance away from the face of the mold, the distal ends of the fingers may be disposed a second distance away from the base of the tool and the outermost portions of the outwardly extending portions of the fingers may be spaced a second distance apart. When the distance separating the outermost portions of the outwardly extending portions of the fingers is less than the distance separating the innermost portions of the undercuts, the blow-molded plastic structure may be removed or released from the mold.

Still another aspect is a method of manufacturing an undercut in a blow-molded plastic structure. The method may include placing a tool in a portion of a mold and the tool may be used to form the undercut. The method may also include forming a parison and closing the mold around the parison. The parison may be inflated with a gas such as pressurized air. The undercut may be formed by the tool and then the molded structure with the undercut may be released or removed from the mold.

Yet another aspect is a tool that may be used to create an undercut in a blow-molded plastic structure. The tool, for example, may create an inwardly extending portion with an undercut. The tool may include a base and a surface of the base may help form a portion of the blow-molded plastic structure. For instance, an upper surface of the base may be generally aligned with a portion of the mold and the upper surface of the base may help form a portion of the blow-molded plastic structure. The base may include a first guide, such as a pathway or opening, and a first finger may be at least partially disposed in the first guide. The base may also include a second guide, such as a pathway or opening, and a second finger may be at least partially disposed in the second guide. The first guide may help control movement of the first finger relative to the base and the second guide may help control movement of the second finger relative to the base. The base may include an inwardly extending projection, which may also be referred to as a guide, and the inwardly extending projection may have a generally wedge-shaped configuration. The guides may be sized and configured to allow the fingers to move between one or more positions relative to the base. For example, the guides may be sized and configured to allow the fingers to be disposed in a molding position and a release position. When the fingers are in the molding position, the distal ends of the fingers may be disposed a first distance away from the base and the distal ends of the fingers may include outwardly extending portions. In the molding position, the outer portion of the outwardly extending portions may be separated by a distance and the outwardly extending portions may be used to form at least a portion of the undercut. When the fingers are disposed in the release position, the ends of the fingers may be spaced apart from the base of the mold by a second distance and the outmost portions of the outwardly extending portions of the fingers may be separated by a second distance. When the distance separating the outmost portions of the outwardly extending portions of the fingers is less than a distance separating the innermost portion of the inwardly extending portion of the blow-molded plastic structure, the structure may be removed or released from the tool.

Still yet another aspect is a method of manufacturing a blow-molded plastic structure that may comprise placing a tool in a portion of a mold for blow-molding a plastic structure, forming a parison of molten plastic, disposing the parison of molten plastic in the mold, closing the mold around the parison of molten plastic, inflating the parison, and creating an inwardly extending portion with an undercut with the tool. The method may include releasing the inwardly extending portion with the undercut from the tool by moving the tool from a molding position to a release position. The method may include concurrently releasing the molded plastic structure from the mold and releasing the inwardly extending portion with the undercut from the tool. The method may include creating a receiving portion disposed between an upper surface of the undercut and an upper surface of the inwardly extending portion. The method may include creating an edge of the undercut and the edge may be disposed at an acute angle relative to a surface of the undercut, the acute angle may be about ninety degrees (90°), about eighty five degrees (85°), about eighty degrees (80°), about seventy five degrees (75°), about seventy degrees (70°), or less than about seventy degrees (70°).

A further aspect is a tool that may be used to create an undercut in a blow-molded plastic structure constructed using a blow-molded process, the tool may comprise a base; a first guide at least partially disposed in the base; a second guide at least partially disposed in the base; a first finger at least partially disposed in the first guide, the first finger being movable relative to the base between a molding position and a release position, the first finger including an elongated body and an outwardly extending portion; and a second finger at least partially disposed in the second guide, the second finger being movable relative to the base between a molding position and a release position, the second finger including an elongated body and an outwardly extending portion. When the first finger and the second finger are disposed in the molding position, an upper surface of the outwardly extending portion of the first finger and an upper surface of the outwardly extending portion of the second finger may be generally aligned in the same plane; and when the first finger and the second finger are disposed in the release position, the upper surface of the outwardly extending portion of the first finger and the upper surface of the outwardly extending portion of the second finger may be generally aligned in the same plane. When the first finger and the second finger are disposed in the molding position, an upper surface of the outwardly extending portion of the first finger and an upper surface of the outwardly extending portion of the second finger may be disposed a first distance from the base; and when the first finger and the second finger are disposed in the release position, the upper surface of the outwardly extending portion of the first finger and the upper surface of the outwardly extending portion of the second finger may be disposed a second distance from the base, the second distance may be greater than the first distance. The first finger may move along a first axis that is disposed at an angle relative to the base and the second finger may move along a second axis that is disposed at an angle relative to the base, the angle of the first axis relative to the base may be generally the same as the angle of the second axis relative to the base. The outwardly extending portion of the first finger may be disposed a first distance from the outwardly extending portion of the second finger when the first finger and the second finger are in the molding position; the outwardly extending portion of the first finger may be disposed a second distance from the outwardly extending portion of the second finger when the first finger and the second finger are in the release position; and the second distance may be smaller than the first distance to allow the outwardly extending portion of the first finger and the outwardly extending portion of the second finger to be removed from the undercut formed in the blow-molded plastic structure.

Another aspect is a table that may include a blow-molded plastic tabletop. The blow-molded plastic tabletop may be constructed using a blow-molding process and the tabletop may include an upper surface, a lower surface, a frame receiving portion disposed in the lower surface of the tabletop, a first frame connecting structure with an undercut disposed in a first portion of the frame receiving portion, and a second frame connecting structure with an undercut disposed in a second portion of the frame receiving portion. A frame may be connected to the table and a first portion of the frame may contact the first frame connecting structure and a second portion of the frame may contact the second frame connecting structure. The table may include one or more support members that are sized and configured to support the tabletop above a surface.

Still another aspect is a blow-molded plastic tabletop that may include an upper surface, a lower surface, a frame receiving portion disposed in the lower surface of the tabletop, a first frame connecting structure with an undercut disposed in a first portion of the frame receiving portion, and a second frame connecting structure with an undercut disposed in a second portion of the frame receiving portion. A frame may be connected to the tabletop. For example, a first portion of a frame may engage a lower surface of the undercut of the first frame connecting structure and the second portion of the frame may engage a lower surface of the undercut of the second frame connecting structure. The first frame connecting structure may be disposed on a first side of the frame receiving portion and the second frame connecting structure may be disposed on a second side of the frame receiving portion. The first fame connecting structure may be an outwardly extending structure with an undercut. The second fame connecting structure may be an inwardly extending structure with an undercut. The frame may be connected to the tabletop without the use of any fasteners. The tabletop, including the upper surface, the lower surface, the frame receiving portion, the first frame connecting structure with an undercut, and the second frame connecting structure with an undercut, may be integrally formed as part of a unitary, one-piece structure during the blow-molding process. A portion of the frame may be inserted into the frame receiving portion and then the frame may be moved within the frame receiving portion to engage the first portion of the frame with the undercut of the first frame connecting structure and to engage the second portion of the frame with the undercut of the second frame connecting structure. The frame may include a cutout and the cutout may allow the frame to be inserted into the frame receiving portion. The frame may include one or more outwardly extending tabs and the tabletop may include one or more receiving portions, and the tabs may be disposed in the receiving portions when the frame is connected to the tabletop. After reviewing this disclosure, it will be appreciated that the blow-molded tabletop may include any suitable number of frame connecting structures and/or undercuts. It will also be appreciated, after reviewing this disclosure, that the frame connecting structures, the undercuts, and/or the frame connecting structures with an undercut may have different shapes, sizes, configurations, and/or arrangements, depending, for example, upon the size or type of table.

Yet another aspect is a method of connecting a frame to a blow-molded plastic tabletop. The method may include providing a tabletop with a frame receiving portion, the frame receiving portion may include a first frame connecting structure with an undercut disposed in a first portion of the frame receiving portion and a second frame connecting structure with an undercut disposed in a second portion of the frame receiving portion. The method may also include inserting a portion of the frame into the frame receiving portion and moving the frame relative to the tabletop so that a first portion of the frame may contact the first frame connecting structure and a second portion of the frame may contact the second frame connecting structure. In addition, the first portion of the frame may engage a lower surface of the undercut of the first frame connecting structure and the second portion of the frame may engage a lower surface of the undercut of the second frame connecting structure. The first frame connecting structure may be disposed on a first side of the frame receiving portion and the second frame connecting structure may be disposed on a second side of the frame receiving portion. The first portion of the frame may engage the undercut of the first frame connecting structure and the second portion of the frame may engage the undercut of the second frame connecting structure. The frame may include one or more outwardly extending tabs and the tabletop may include one or more receiving portions, and the tabs may be disposed in the receiving portions when the frame is connected to the tabletop. After reviewing this disclosure, it will be appreciated that the blow-molded tabletop may include any suitable number of frame connecting structures with an undercut, and one or more receiving portions. It will also be appreciated, after reviewing this disclosure, that the frame may include one or more outwardly extending tabs. Therefore, the frame may include one or more tabs and the tabs may be disposed in one or more receiving portions. Further, the table may include any suitable number of components or features, such as one or more frame receiving portions, frame connecting structures, tabs, receiving portions, and the like.

Another aspect is an apparatus that may comprise a blow-molded plastic tabletop including an upper portion, a lower portion, and a hollow interior portion that is created during the blow-molding process. The blow-molded plastic tabletop may comprise a frame receiving portion disposed in a lower portion of the blow-molded plastic tabletop, a first frame connecting structure with an undercut formed in a first portion of the frame receiving portion, and a second frame connecting structure with an undercut formed in a second portion of the frame receiving portion. A frame may be disposed in the frame receiving portion of the tabletop. The frame may comprise a first portion of the frame disposed at least proximate the undercut of the first frame connecting structure, and a second portion of the frame disposed at least proximate the undercut of the second frame connecting structure. In an exemplary embodiment, the first frame connecting structure with the undercut may be formed in an outer wall of the blow-molded plastic tabletop during the blow-molding process, and the second frame connecting structure with the undercut may be formed in an outer wall of the blow-molded plastic tabletop during the blow-molding process. In another exemplary embodiment, the first frame connecting structure with the undercut may be formed in the frame receiving portion of the blow-molded plastic tabletop during the blow-molding process, and the second frame connecting structure with the undercut may be formed in the frame receiving portion of the blow-molded plastic tabletop during the blow-molding process. In still another exemplary embodiment, the first frame connecting structure may comprise an outwardly extending portion with a projection and an overhang, and the undercut may be disposed under the overhang, and the second frame connecting structure may comprise an inwardly extending portion with a receiving portion and an overhang, and the undercut may be disposed under the overhang. In another exemplary embodiment, the upper portion, the lower portion, the hollow interior portion, the frame receiving portion, the first frame connecting structure with the undercut, the second frame connecting structure with the undercut may be formed during the blow-molding process as part of a unitary, one-piece structure. In a further exemplary embodiment, the undercut of the first frame connecting structure and the undercut of the second frame connecting structure may be formed during the blow-molding process without the removal of material after formation and without significant deformation when the blow-molded plastic tabletop is removed from a mold during the blow-molding process.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages and features of the present invention. It will be appreciated that these drawings depict only exemplary embodiments of the invention and are not intended to limit its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

FIG. 1A is an upper perspective view of an exemplary molded plastic structure and a support, such as a frame;

DETAILED DESCRIPTION OF SOME EMBODIMENTS

Figure 1B:
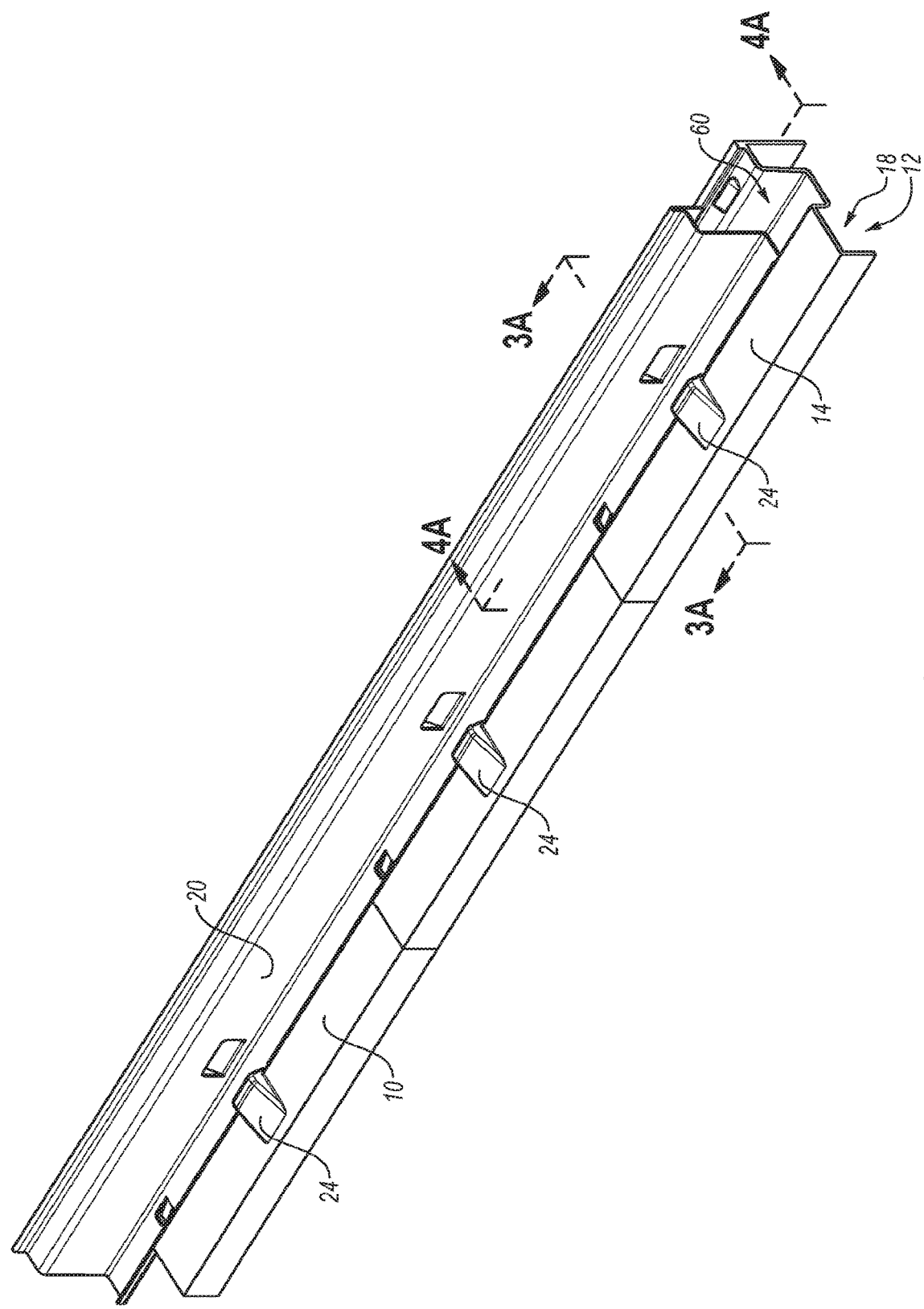
FIG. 1B is an upper perspective view of the molded plastic structure and frame shown in FIG. 1A, illustrating the frame and molded plastic structure disposed in a first position.

The following exemplary embodiments are generally described in connection with blow-molded plastic structures such as a tabletop. The principles of the present invention, however, are not limited to a tabletop. In particular, the principles of the present invention may be implemented in other articles of furniture and in other structures that include blow-molded plastic components. In addition, it will be understood that, with the benefit of the present disclosure, the structures can have a variety of shapes, sizes, configurations, and arrangements. Moreover, the invention disclosed herein and components thereof may be successfully used in connection with other types of structures such as furniture (e.g., tables, picnic tables, chairs, etc.), objects (e.g., sheds, deck boxes, coolers, garden boxes, playground equipment, sporting goods, water sports equipment, etc.), and the like.

To assist in the description of exemplary embodiments shown in the accompanying figures, words such as top, bottom, front, rear, right and left may be used. The accompanying figures may be, but are not necessarily, drawn to scale. It will further be appreciated the structures can be disposed in a variety of desired positions or orientations, and used in numerous locations, environments and arrangements. A detailed description of some exemplary embodiments of the structures now follows.

An exemplary structure may be constructed from molded plastic. The exemplary molded plastic structure may be constructed from blow-molded plastic. In the accompanying figures, the exemplary molded plastic structure may be referred to as a tabletop or a portion of a tabletop 10. The tabletop 10 may include an upper portion 12, a lower portion 14, and an outer boundary 16. The upper portion 12 and the lower portion 14 of the tabletop 10 may be spaced apart by a distance. The tabletop 10 may include a hollow interior portion 18 and at least a portion of the hollow interior portion 18 may be disposed between the upper portion 12 and the lower portion 14. The hollow interior portion 18 may be filled with foam or other suitable materials, if desired.

The tabletop 10 may further include one or more sides, corners, and ends. The tabletop 10 may be integrally formed as part of unitary, one-piece structure during the blow-molding process. It will be appreciated that the tabletop 10 may have a variety of suitable shapes, sizes, configurations, and/or arrangements depending, for example, upon the intended use of the table. It will also be appreciated that the tabletop 10 may be constructed using various materials and may include one or more features, aspects, and the like. While the molded plastic structure may be described as being a tabletop or a portion of a tabletop, it will be appreciated that the molded plastic structure may another suitable structure such as a chair seat, shed, deck box, and the like.

Although not shown in the accompanying figures, the tabletop 10 may form a portion of a table and the table may include one or more support structures or legs, which may be sized and configured to support the tabletop above a surface such as the floor or ground. The support structures may include one or more supports and the support structures may be movable between a use position and a collapsed or storage position. It will be appreciated that the table may include any suitable number of support structures and/or legs depending, for example, upon the intended use of the table. It will also be appreciated that the support structures and/or legs may have different shapes, sizes, configurations, and/or arrangements depending, for example, upon the type or intended use of the table.

The table may include a frame 20 that is connected to the tabletop 10. The frame 20 may support the tabletop 10, and the frame may facilitate attachment of the support structures or legs to the table. The exemplary frame 20 shown in the accompanying figures may be a side rail or a portion of a side rail, and the side rail may be disposed at least proximate one or more sides of the tabletop 10. It will be appreciated that the tabletop 10 and the frame 20 may have different shapes, sizes, configurations, and/or arrangements depending, for example upon the type or intended use of the table. It will be appreciated that the tabletop 10 and the frame 20 may have other components, features, aspects, characteristics and the like, if desired.

It will be appreciated with the benefit of the present disclosure that the tabletop 10 and the frame 20 may include any suitable number of components and the components may have various sizes, shapes, configurations, and arrangements depending, for example, upon the intended use of the table. It will further be appreciated that the tabletop 10 and the frame 20 may include other components, features, aspects, characteristics and the like, if desired; but none of the features, aspects or components may be required.

The tabletop 10 may include one or more undercuts 22. For example, the tabletop 10 may include an outwardly extending portion 24 with an undercut 22. As shown in the accompanying figures, the outwardly extending portion 24 may extend outwardly from a portion of the tabletop 10 and it may include a projection 26 with an undercut 22. For instance, the outwardly extending portion 24 may include a ramp or sloped surface 28 and an overhang 30. A relief or recess 32 may be disposed under the overhang 30 and the lower surface 34 of the overhang 30 may include a generally planar surface. The lower surface 34 of the overhang 30 may be disposed at an angle and the lower surface of the overhang may be sized and configured to engage or contact a portion of the frame.

The tabletop may include an inwardly extending portion 40 with an undercut 22. As shown in the accompanying figures, the inwardly extending portion 40 may extend inwardly into a portion of the tabletop 10 and it may include a projection 42 with an undercut 22. The inwardly extending portion 40 may include an opening 44 and a receiving portion 46. The inwardly extending portion 40 may include an undercut 22 with a relief or recess 48 and the lower surface 50 of the overhang 52 may include a generally planar surface. The lower surface 50 of the undercut 22 may be disposed at an angle and the lower surface 50 of the undercut 22 may be sized and configured to engage or contact a portion of the frame 20.

The tabletop 10 may include a frame receiving portion 60 that is sized and configured to receive at least a portion of a frame 20. For example, the frame receiving portion 60 may include a channel or recess disposed in a lower portion 14 of the tabletop 10. The frame receiving portion 60 may include a first portion 62 and a structure with an undercut may be disposed in the first portion of the frame receiving portion. Thus, in an exemplary embodiment, the frame receiving portion 60 may include a first portion 62 and the first portion may include a structure with an undercut. The frame receiving portion 60 may include a second portion 64 and a structure with an undercut may be disposed in the second portion of the frame receiving portion. Thus, in an exemplary embodiment, the frame receiving portion 60 may include a second portion 64 and the second portion may include a structure with an undercut.

Figure 1C:
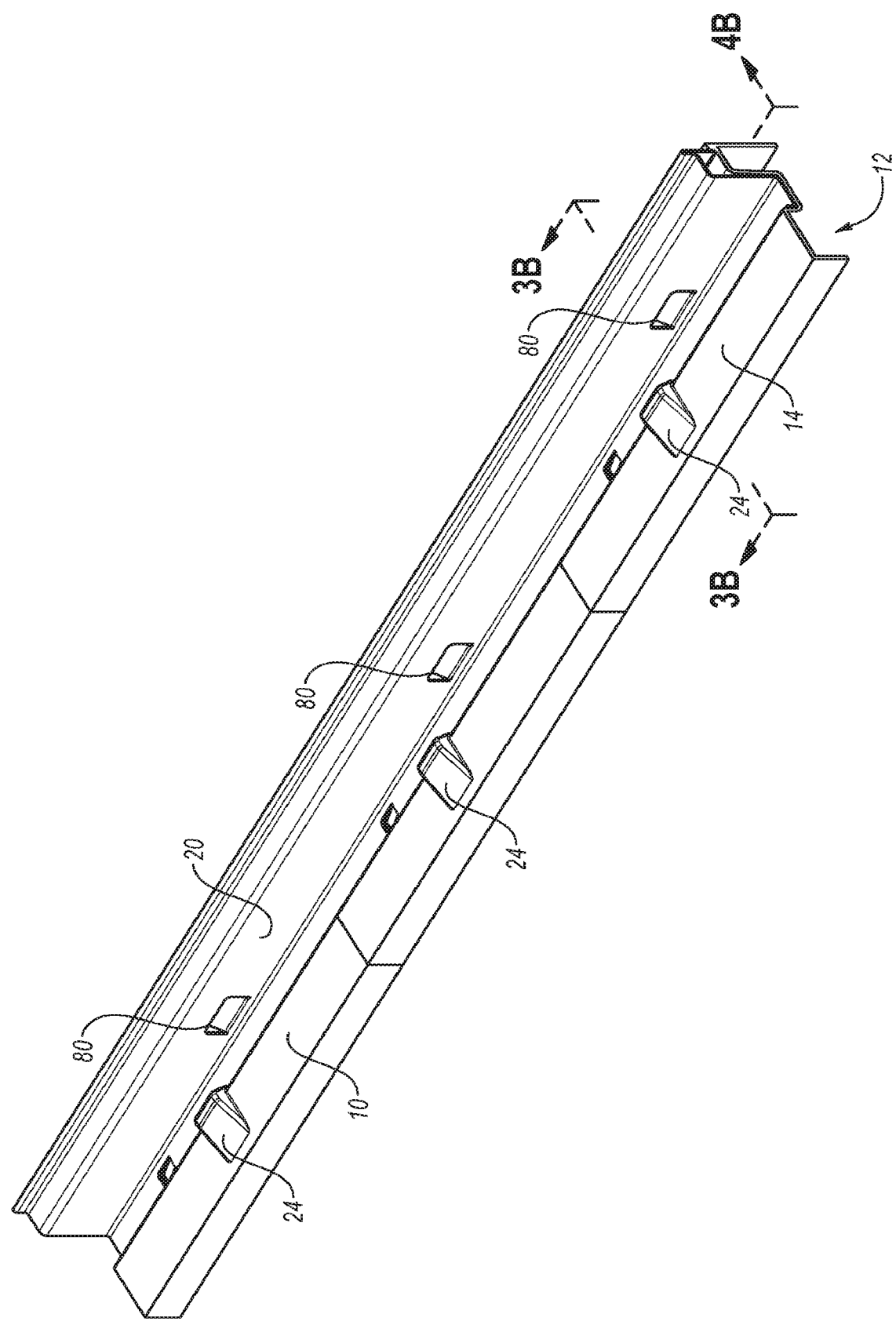
FIG. 1C is an upper perspective view of the molded plastic structure and frame shown in FIG. 1A, illustrating the frame and molded plastic structure disposed in a second position.

In an exemplary embodiment, the frame receiving portion 60 may include a first side or portion 62, and the first portion 62 of the frame receiving portion 60 may include one or more undercuts 22. In particular, the first portion 62 of the frame receiving portion 60 may include one or more structures and one or more undercuts 22. For example, as shown in FIGS. 1A to 1C, the frame receiving portion 60 may include a first portion 62 with outwardly extending portions 24 and the outwardly extending portions 24 may include one or more undercuts 22. The frame receiving portion 60 may include a second portion 64 with one or more structures and one or more undercuts 22. For example, the second portion 64 of the frame receiving portion 60 may include one or more inwardly extending portions 40 and the inwardly extending portions 40 may include one or more undercuts 22. As shown in the accompanying figures, the undercut 22 on the first portion 62 of the frame receiving portion 60 may be at least partially aligned with the undercut 22 on the second portion 64 of the frame receiving portion 60. After reviewing this disclosure, it will be appreciated that any suitable number, shape, size, configuration, and/or arrangement of undercuts 22 may be disposed on the first portion 62 and/or the second portion 64 of the frame receiving portion 60. After reviewing this disclosure, it will also be appreciated that one or more undercuts 22 may be aligned, generally disposed in the same plane, disposed in a symmetrical configuration, and the like. The undercuts 22, however, do not have to be aligned, generally disposed in the same plane, or disposed in a symmetrical configuration. Instead, the undercuts 22 may be offset, spaced apart, and/or disposed in other suitable configurations and arrangements. Further, the undercuts 22 may be any suitable combination of outwardly extending and/or inwardly extending structures depending, for example, upon the intended use of the table.

The frame 20 may be sized and configured to be at least partially disposed in the frame receiving portion 60. The frame 20 may include one or more openings 80 or cutouts, and the openings 80 to allow the frame 20 to be at least partially disposed in the frame receiving portion 60. For example, the frame 20 may include an opening or cutout 80 that allows the frame 20 to be disposed about the outwardly extending structure 24, and the outwardly extending structure 24 may include one or more undercuts 22. The frame 20 may also include a surface that is sized and configured to engage or contact a corresponding surface of the undercut 22 when the frame 20 is connected to the tabletop 10.

The frame 20 may include one or more tabs 84, or outwardly extending portions, that are sized and configured to be at least partially disposed in the inwardly extending structures or portions 40, and the inwardly extending portions 40 may include one or more undercuts 22. For example, the tab 84 may be disposed in the opening 44 of the inwardly extending structure 40 when the frame 20 is inserted into the frame receiving portion 60. The tab 84 may include a surface that is sized and configured to engage or contact a corresponding surface of the undercut 22 when the frame 20 is connected to the tabletop 10.

Advantageously, the frame 20 and frame receiving portion 60 may be sized and configured to allow the frame 20 to be inserted into the frame receiving portion 60. When the frame 20 is inserted into the frame receiving portion 60, the frame 20 may be moved so that the frame engages the one or more undercuts 22 on the first side or portion 62 of the frame receiving portion 60, and/or the one or more undercuts 22 on the second side or portion 64 of the frame receiving portion 60. The engagement of one or more portions of the frame 20 with one or more undercuts 22 may facilitate secure attachment of the frame 20 to the tabletop 10. In addition, if one or more undercuts 22 are disposed on a first side or portion 62 of the frame receiving portion 60 and one or more undercuts 22 are disposed on a second side or portion 64 of the frame receiving portion 60, the frame 20 may be securely connection to the tabletop 10.

For example, FIG. 1A illustrates an exemplary portion of the tabletop 10 and an exemplary portion of the frame 20.

The tabletop 10 may include an upper portion 12, a lower portion 14, an outer boundary 16, and a hollow interior portion 18 that may be formed during the blow-molding process. The tabletop 10 may include one or more structures and one or more undercuts 22. For example, the tabletop 10 may include one or more structures such as one or more outwardly extending structures or portions 24. The outwardly extending portions 24 may include a protrusion or projection 26, an overhang 30, and a relief or recess 32. The lower surface of the outwardly extending portion 24, which may be the lower surface of the overhang 30, may have an absence of material, and that may form at least a portion of the undercut 22. The undercut 22 may include an upper surface, which may be the lower surface of the outwardly extending portion 24 or the lower surface of the overhang 30. The undercut 22 may include a first end and a second end. The first end of the undercut 22, for example, may be disposed at least proximate an outer wall of the blow-molded plastic structure, such as the lower portion 14 of the tabletop 10. The first end of the undercut 22 may also be disposed at least proximate a portion of the frame receiving portion 60. The second end of the undercut 22 may be disposed away from the outer wall of the blow-molded plastic structure, such as the lower portion 14 of the tabletop 10. The second end of the undercut 22 may also be disposed away from the frame receiving portion 60. The undercut 22 may also include the recess 32, and one side of the recess may be at least partially formed by an outer wall of the blow-molded plastic structure, such as the lower portion 14, or a portion of the frame receiving portion 60. The recess 32 may include an upper surface, which may be the upper surface of the undercut 22. The recess 32 may be at least partially formed by an outer portion of the outwardly extending portion 24. The outer portion may extend at an angle relative to the overhang 30 and/or the lower surface 34.

As shown in FIG. 1B, the frame 20 may be at least partially disposed in a frame receiving portion 60 of the tabletop 10. As shown in FIG. 1C, the frame 20 may be moved relative to the tabletop 10 to connect the tabletop 10 and the frame 20.

Figure 2A:
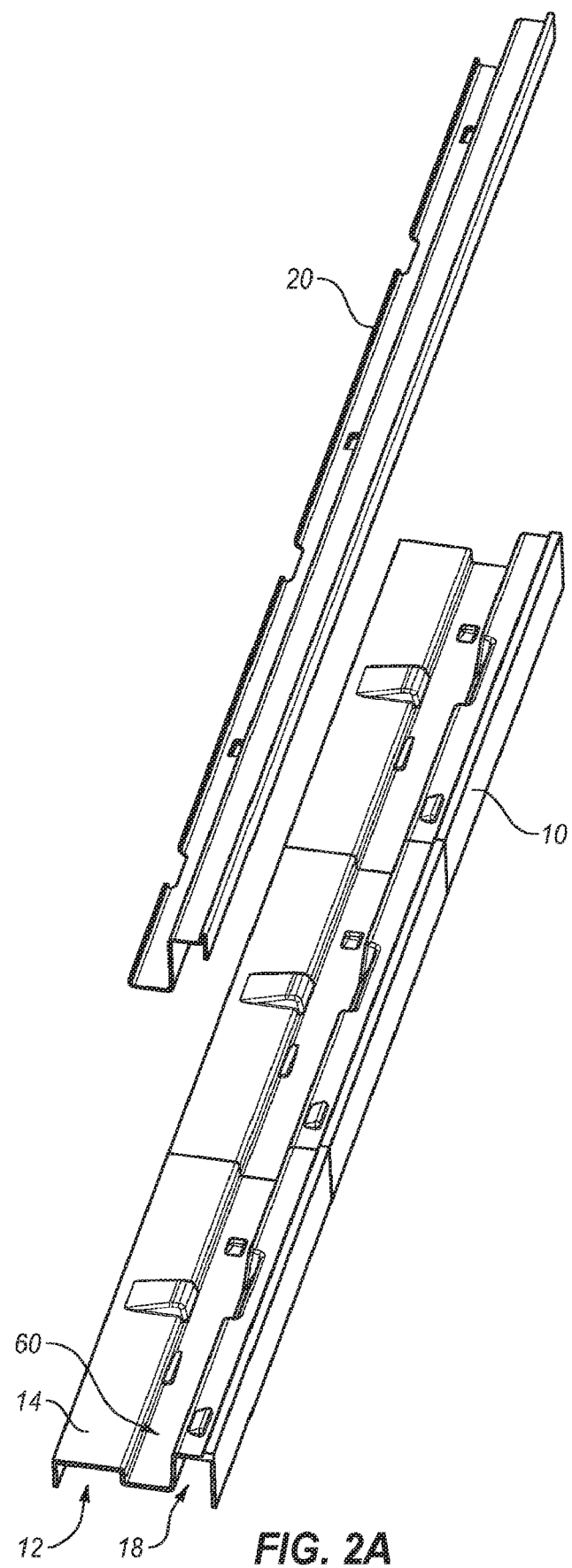
FIG. 2A is an upper perspective view of an exemplary molded plastic structure and a support, such as a frame.
Figure 2B:
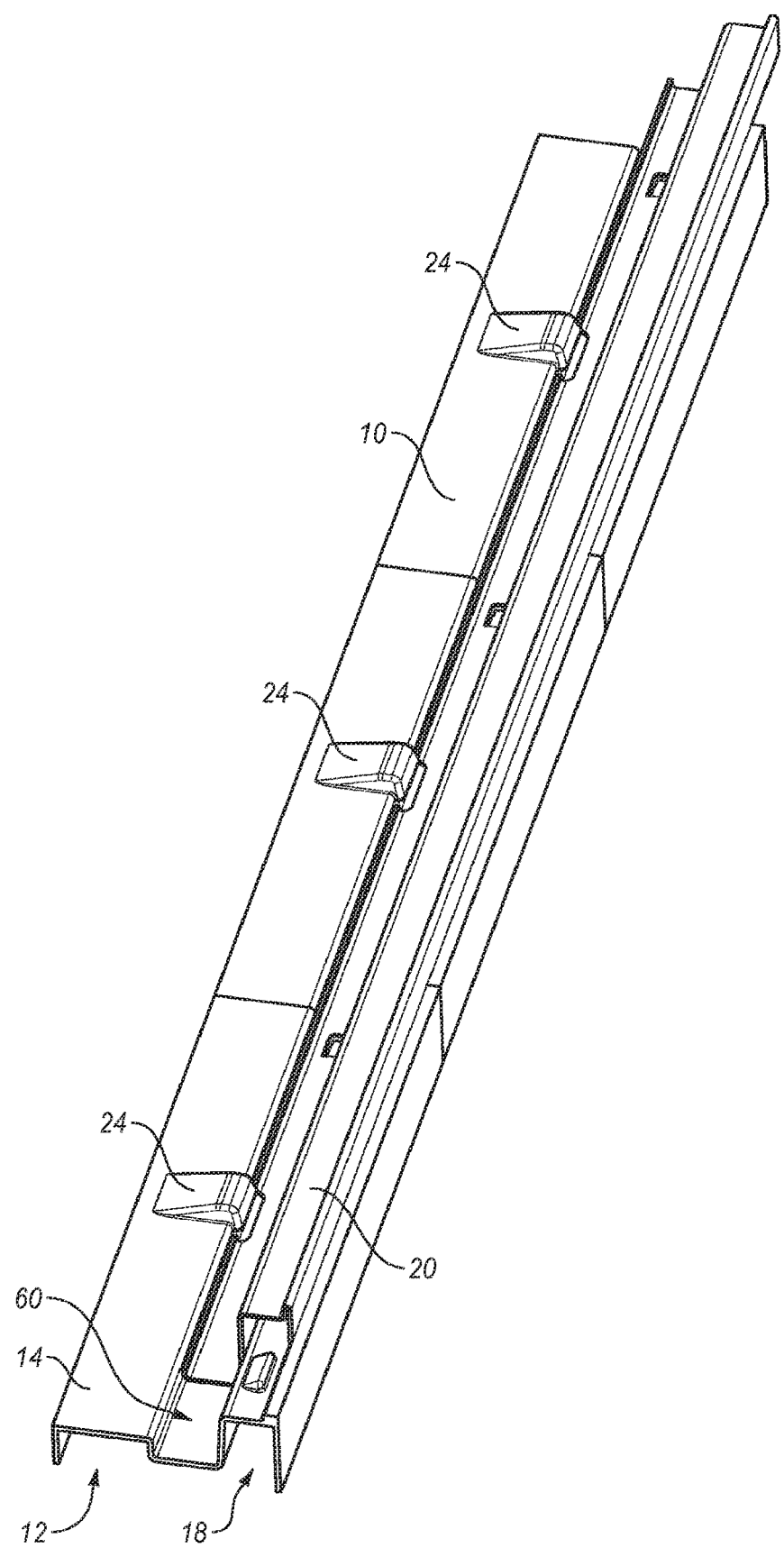
FIG. 2B is an upper perspective view of the molded plastic structure and frame shown in FIG. 2A, illustrating the frame and molded plastic structure disposed in a first position.
Figure 2C:
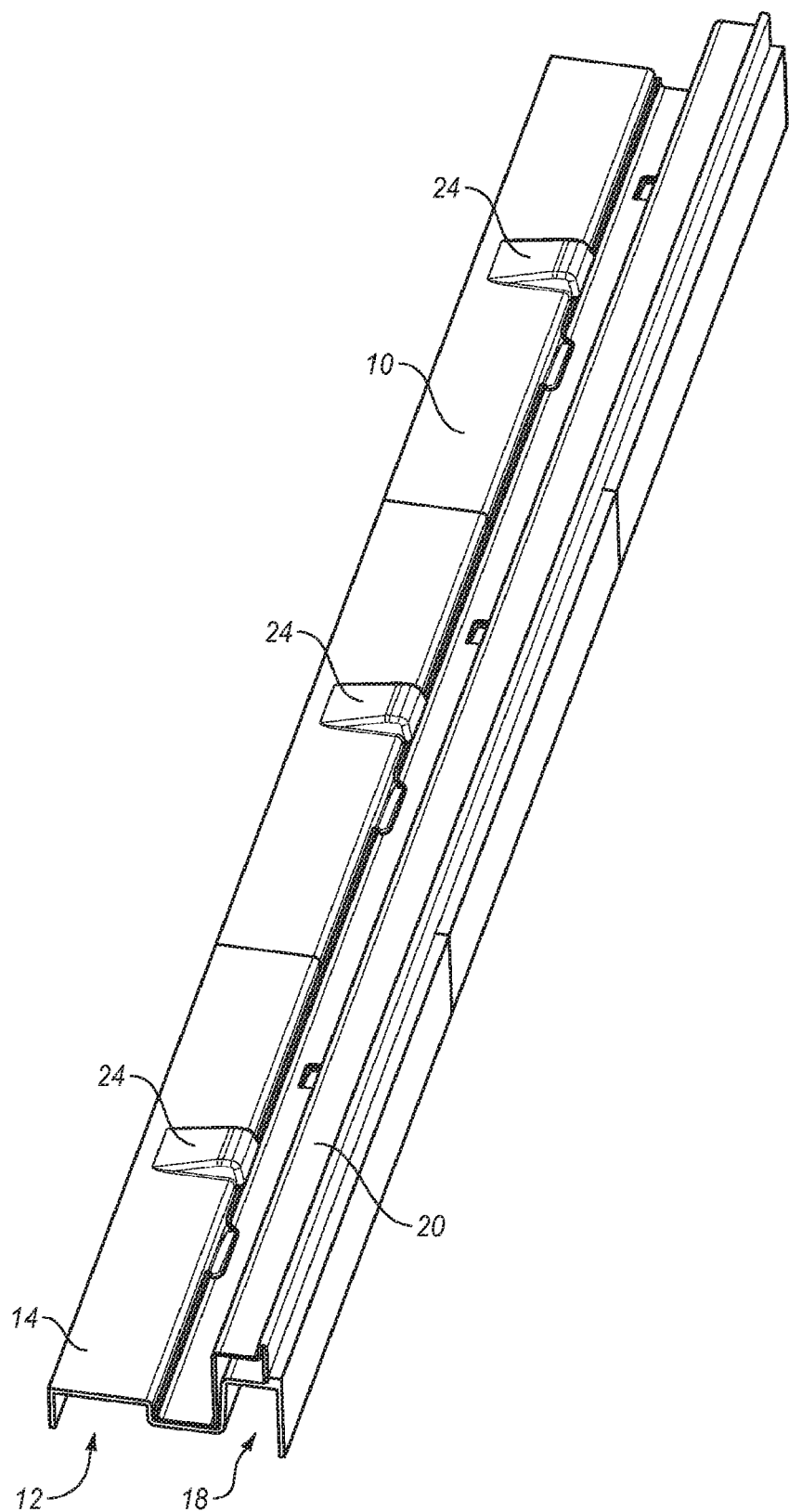
FIG. 2C is an upper perspective view of the molded plastic structure and frame shown in FIG. 2A, illustrating the frame and molded plastic structure disposed in a second position.

FIGS. 2A-2C illustrate another exemplary embodiment of the tabletop 10 and the frame 20. For example, FIG. 2A illustrates the frame 20 spaced apart from the tabletop 10. FIG. 2B illustrate the frame 20 at least partially disposed in the frame receiving portion 60 of the tabletop 10. FIG. 2C illustrate the frame 20 may be moved relative to the tabletop 10 to connect the frame and tabletop.

The tabletop 10 and/or the frame 20 may include other features and aspects. For example, the tabletop 10 may include one or more angled surfaces 90, such as ramps, which may help position the frame 20 relative to the tabletop. The angled surfaces 90 may also help prevent unintentional detachment of the frame 20 from the tabletop 10. The tabletop 10 may also include one or more receiving portions 92 that are sized and configured to receiving a portion of the frame 20. The receiving portions 92 may receive a portion of the frame 20 and may help prevent inadvertent disconnection of the frame and tabletop 10. For instance, the frame 20 may include an outwardly extending portion 94 and the outwardly extending portion may move along an angled surface when the frame 20 is being moved within the frame receiving portion 60 to a locked position. When the frame is disposed in the locked position, the outwardly extending portion 94 may be disposed in the receiving portion 92 and engagement of the outwardly extending portion 94 with the receiving portion 92 may help secure the frame 20 in a locked position.

Figure 3A:
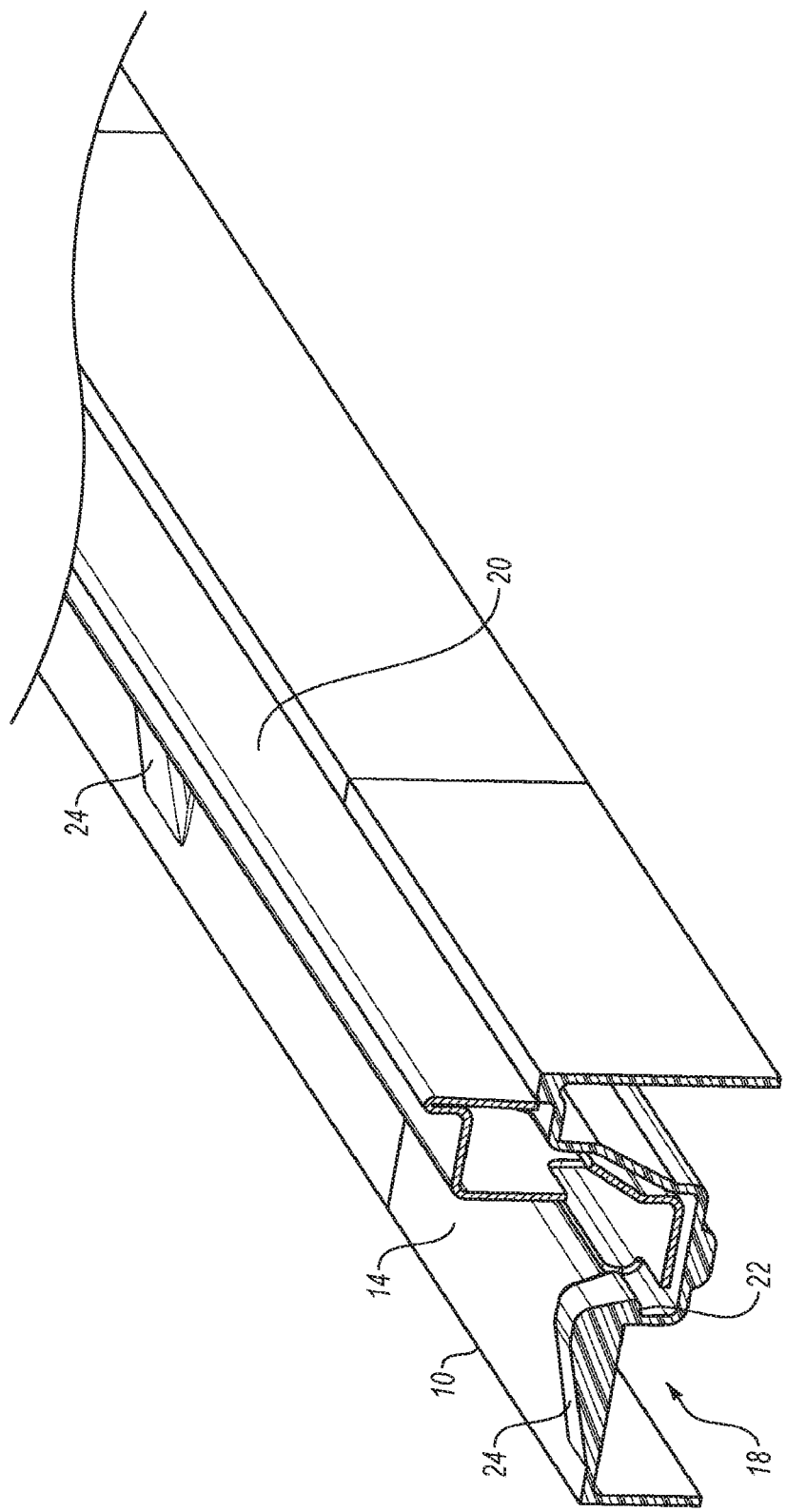
FIG. 3A is cross-sectional side view along lines 3A-3A shown in FIG. 1B.

As shown in FIG. 3A, the frame 20 may be disposed in the frame receiving portion 60 of the tabletop 10, and the frame 20 may be disposed in a first or unlocked position. In this position, the frame 20 may be readily moveable relative to the tabletop 10. For example, the frame 20 may not engage or contact the undercut 22 of the outwardly extending portion 24. The frame 20 may also not be disposed in the recess or receiving portion 32 of the undercut 22. This position may allow the frame 20 to be relatively freely moved relative to the tabletop 10.

Figure 3B:
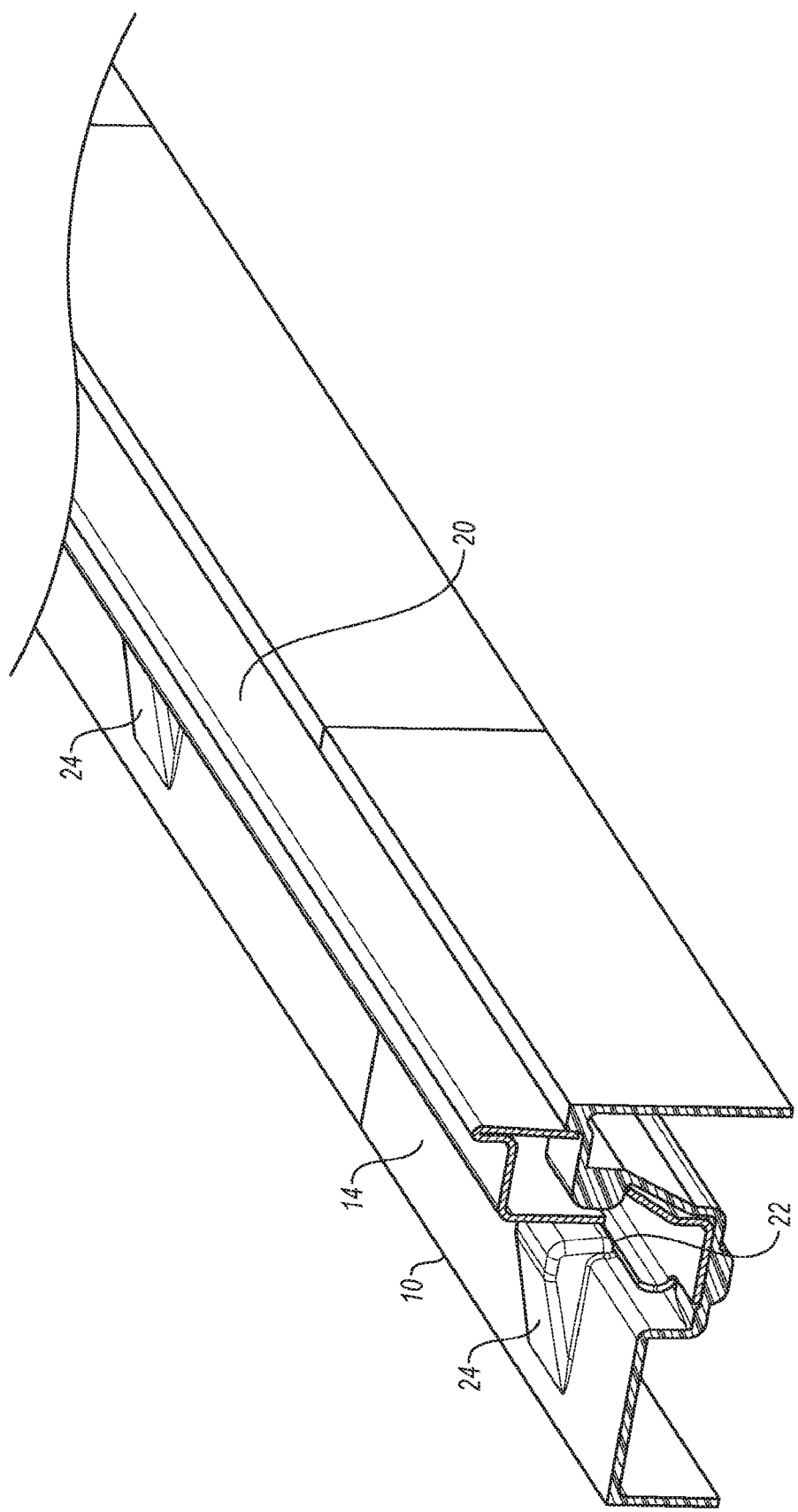
FIG. 3B is cross-sectional side view along lines 3B-3B shown in FIG. 1C.

As shown in FIG. 3B, the frame 20 may be disposed in a second or locked position. In this position, the frame 20 may be secured to the tabletop 10 is a fixed position. For example, in this position, an edge of the frame 20 may engage or contact the undercut 22 of the outwardly extending portion 24. The edge of the frame 20 may also be disposed in the recess or receiving portion of the undercut. The engagement or positioning of the edge of the frame 20 with the undercut 22 of the outwardly extending portion may help prevent unintended movement of the frame 20 relative to the tabletop 10.

Figure 3C:
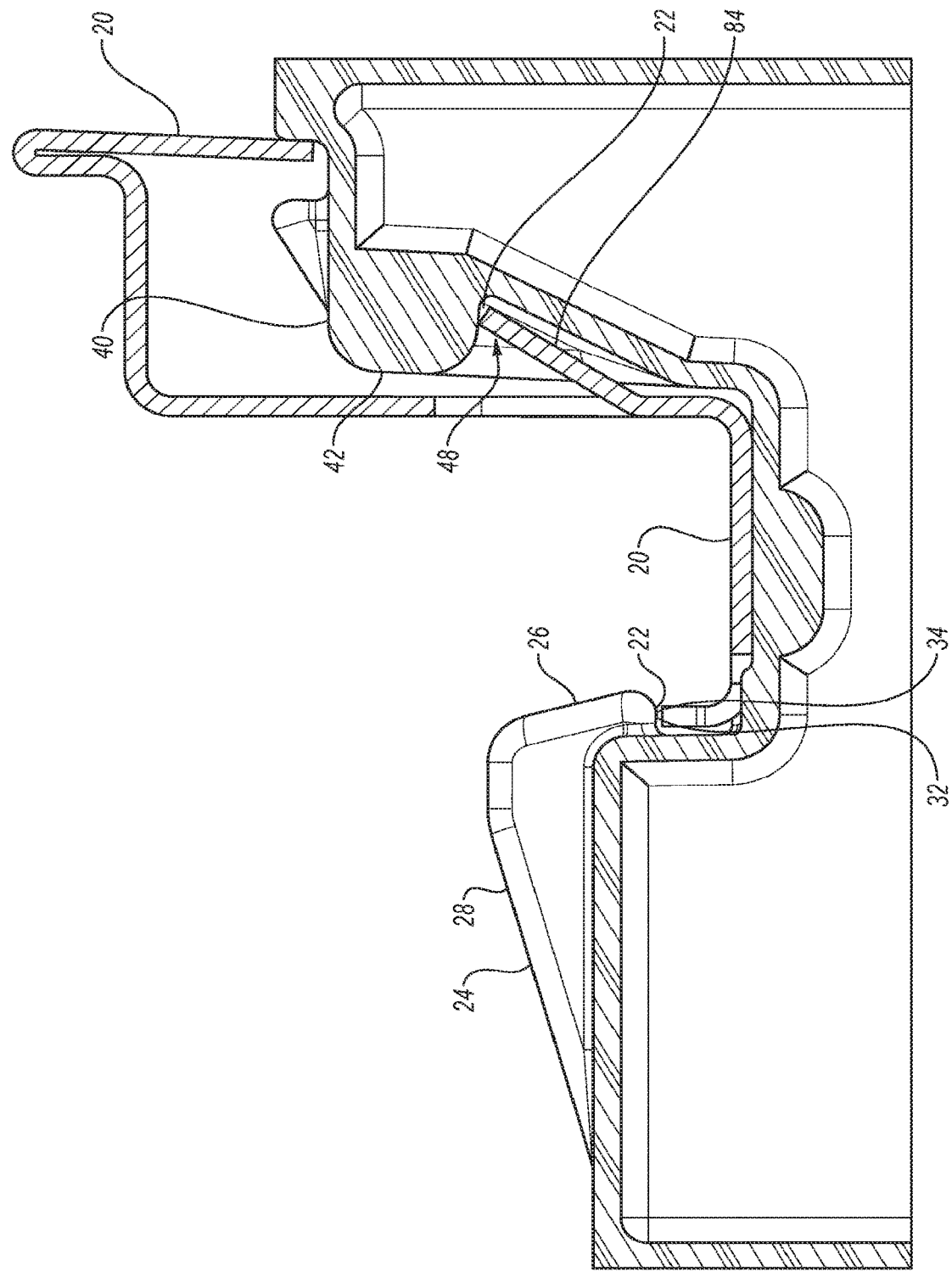
FIG. 3C is a plan view of the cross-sectional side view shown in FIG. 3B.

As shown in FIG. 3C, a portion of the frame 20 may engage or be disposed at least proximate the undercut 22 of the outwardly extending portion 24, which may help secure the frame in a fixed position. Thus, in this exemplary embodiment, a portion of the frame 20 may be held or retained in position by the undercut 22 of the outwardly extending portion 24. Another portion of the frame 20 may engage or be disposed at least proximate the undercut 22 of the inwardly extending portion 40. The inwardly extending portion 40 may include the projection 42 and the recess 48, and a portion of the frame 20, such as the tab 84, may engage or be disposed at least proximate the undercut 22 of the inwardly extending portion 40. Therefore, in this exemplary embodiment, a portion of the frame 20 may be held or retained in position by the undercut 22 of the inwardly extending portion 40.

As shown in the accompanying figures, the one or more undercuts 22 may help hold or retain the frame 20 in a desired position relative to the tabletop 10. Advantageously, the undercuts 22 may be sized and configured to hold or retain different position of the frame 20 in a desired position. For example, the one or more undercuts 22 may be disposed in pairs or sets, and the undercuts 22 may be positioned to facilitate secure attachment of the frame 20 to the tabletop 10. In an exemplary embodiment, the undercuts 22 may be disposed on opposing sides of the frame 20, such as on opposing sides of the frame receiving portion 60. The placement of one or more undercuts 22 on opposing surfaces may help secure the frame 20 in a fixed position.

Figure 4A:
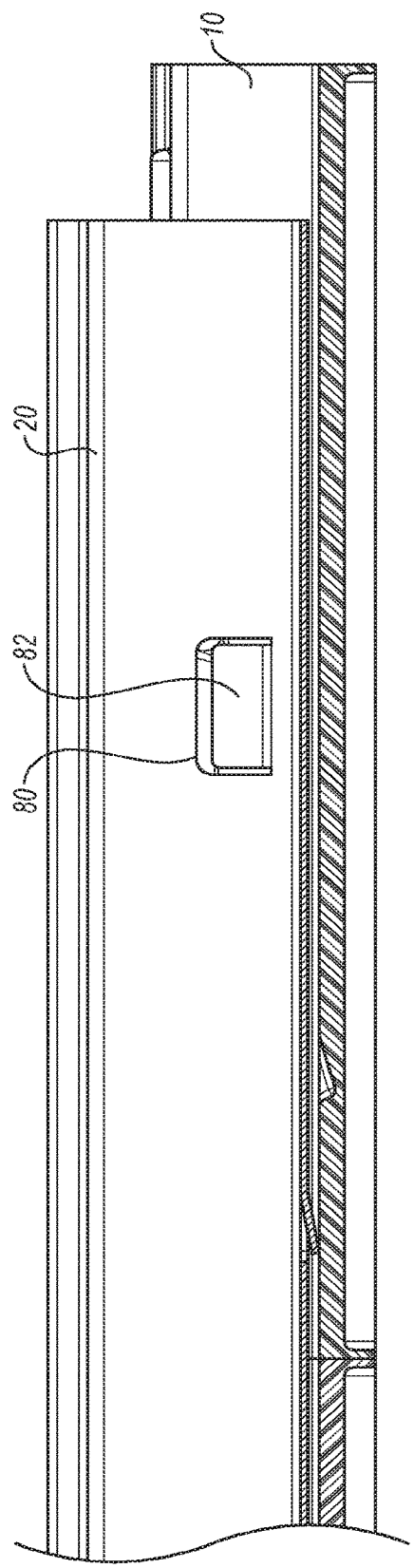
FIG. 4A is cross-sectional side view along lines 4A-4A shown in FIG. 1B.
Figure 4B:
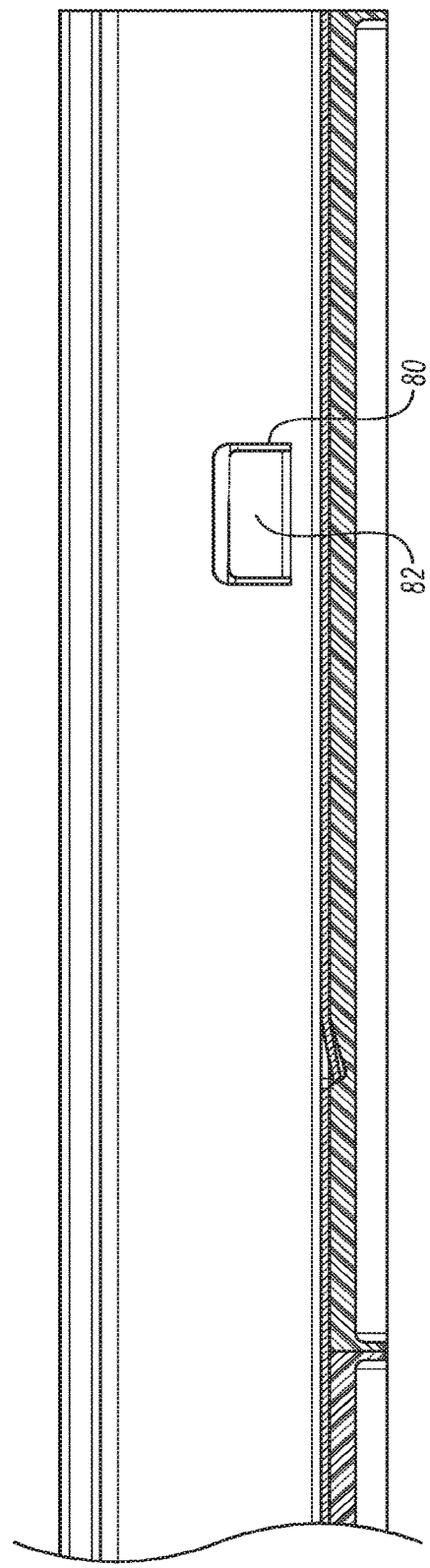
FIG. 4B is cross-sectional side view along lines 4B-4B shown in FIG. 1C.

As shown in FIGS. 4A and 4B, the frame 20 may include one or more angled portions and the angled portions may extend at an angle relative to a body or central portion of the frame. The angled portions may form the tabs 84 and the tabs may include a surface that is sized and configured to be disposed in the opening 44 of the inwardly extending portion 40. The ends of the tabs 84 may engage or be disposed at least proximate the undercut 22 of the inwardly extending portion 40. Therefore, in this exemplary embodiment, the tab 84 of the frame 20 may be held or retained in position by the undercut 22 of the inwardly extending portion 40.

Figure 5A:
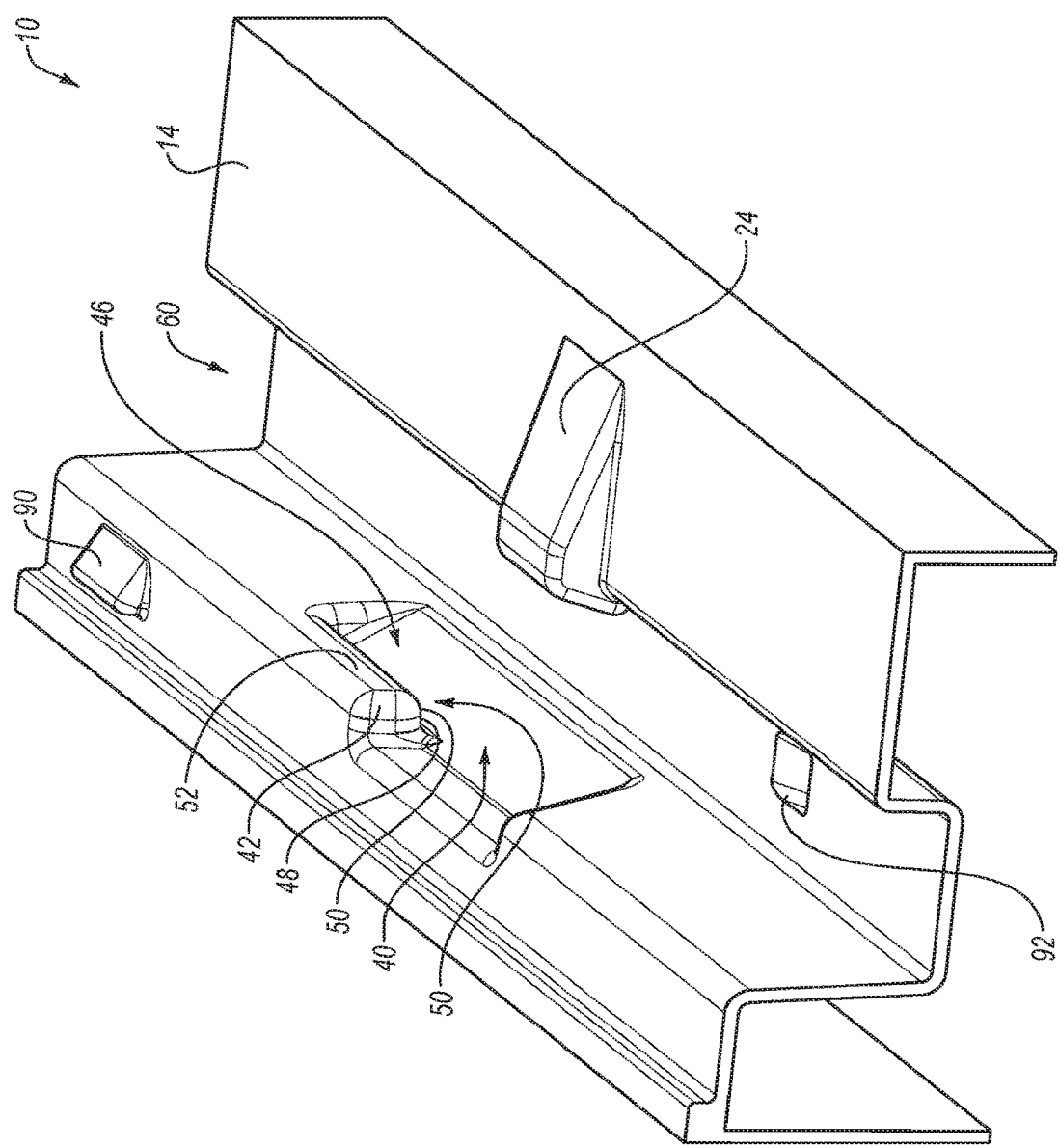
FIG. 5A is an enlarged upper perspective view of an exemplary molded plastic structure.
Figure 5B:
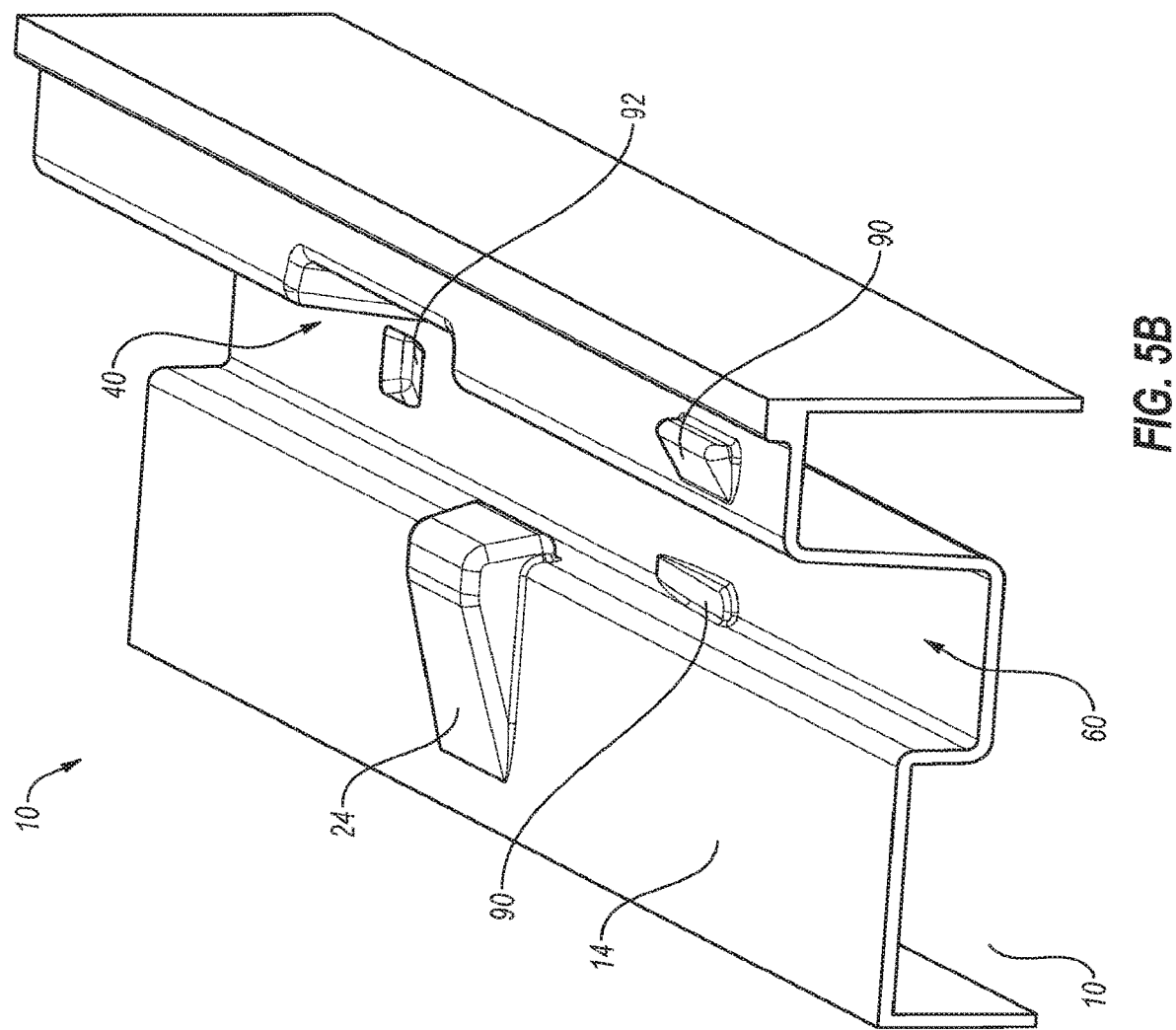
FIG. 5B is another enlarged upper perspective view of an exemplary molded plastic structure.
Figure 5C:
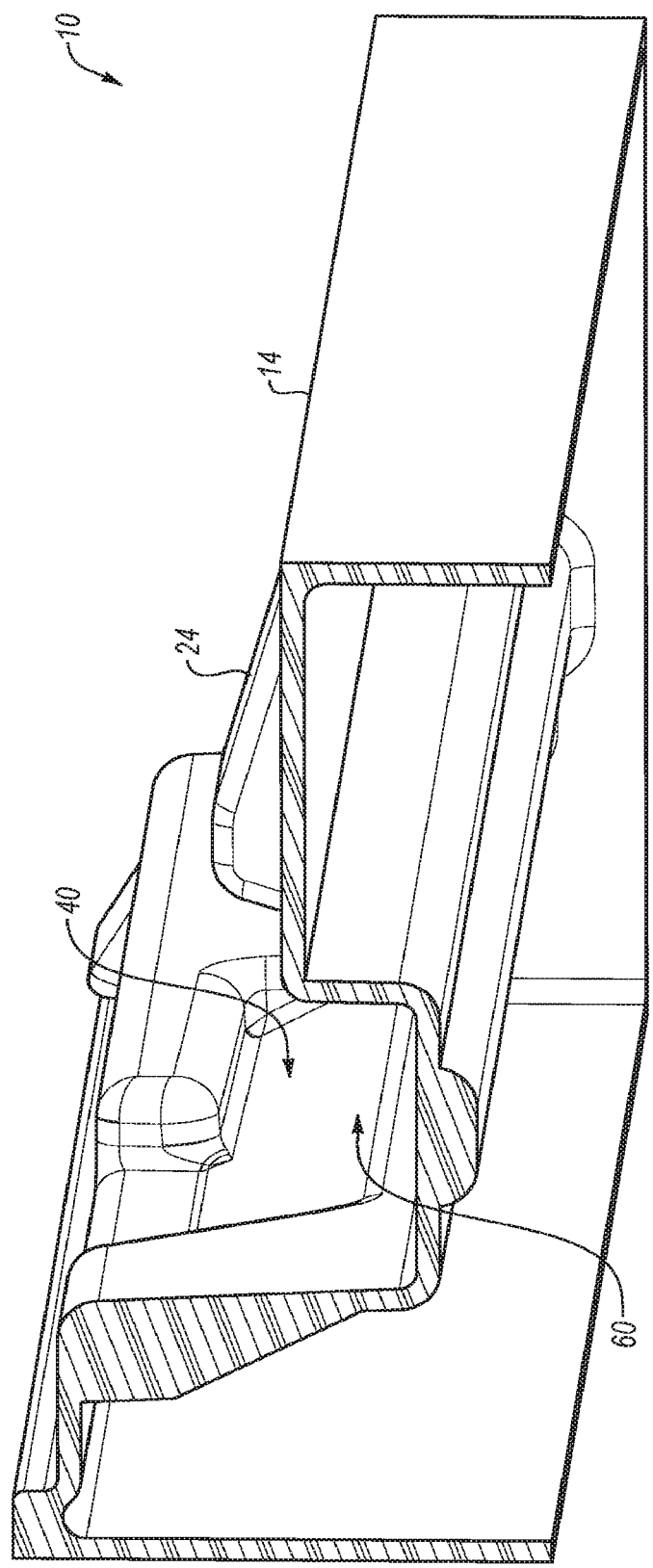
FIG. 5C is a cross-sectional side view of an exemplary molded plastic structure.

As shown in FIGS. 5A-5C, the tabletop 10 may include an outwardly extending portion 24 with an undercut 22, which may be disposed on one side of the frame receiving portion 60, and an inwardly extending portion 40 with an undercut, which may be disposed on a second side of the frame receiving portion 60. The outwardly extending portion 24 and the inwardly extending portion 40 may be positioned to allow the frame 20 to be slid or moved into position. In addition, the ramps or angled surfaces 90 and the receiving portions 92 may help hold the frame 20 in the desired position. For example, the ramps 90 and/or receiving portions 92 may deform, engage, or otherwise prevent unintended movement of the frame 20 relative to the tabletop 10. For instance, the ramps 90 and/or receiving portions 92 may allow the frame 20 to slide or move from the unlocked position to the locked position, such as by moving in a first direction, and the ramps and/or receiving portions may help retain the frame in the locked position, such as by preventing movement in an opposing direction. The frame 20 may include one or more openings and/or outwardly extending portions, such as the outwardly extending portions 94, that are sized and configured to work in connection with the ramps 90 and/or receiving portions 92 to maintain the frame 20 in the locked position.

Figure 6A:
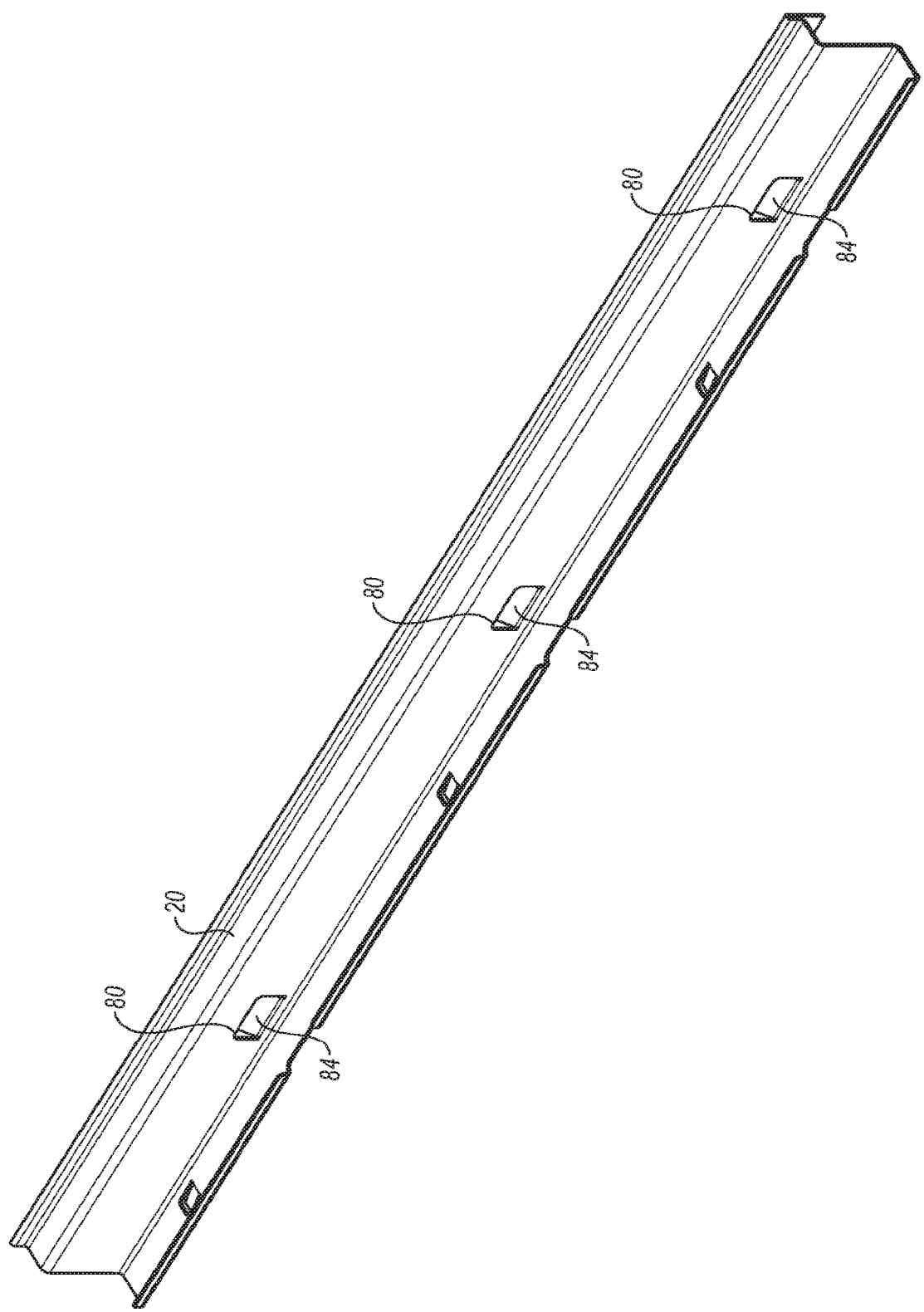
FIG. 6A is an enlarged perspective view of an exemplary support, such as a frame.
Figure 6B:
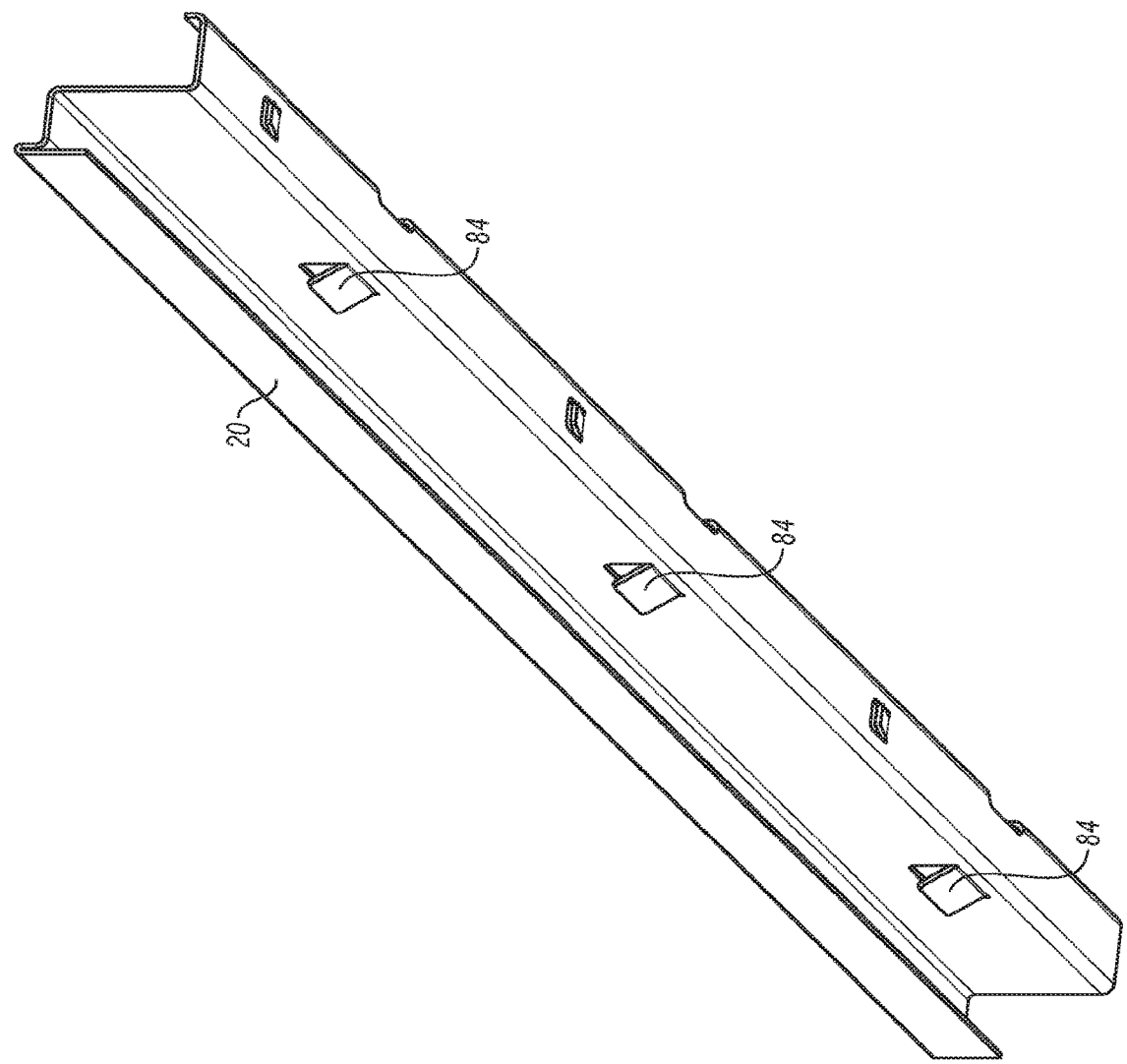
FIG. 6B is another enlarged perspective view of an exemplary support, such as a frame.

The exemplary frame 20 shown in FIGS. 6A and 6B may have an elongated body and the frame may include one or more openings 80 and one or more tabs 84. In addition, the frame 20 may include one or more cutouts, such as the cutouts 86, and the cutouts may facilitate placement of the frame in the frame receiving portion 60. The frame 20 may further include one or more outwardly extending portions 94. The outwardly extending portions 94 may include an opening 96 and a projection 98. The projection 98 may be sized and configured to be disposed in the receiving portions 92, which may help hold the frame 20 in a desired position relative to the tabletop 10.

The outwardly extending portions 24 and the inwardly extending portions 40 with the one or more undercuts 22 cannot be formed with traditional blow-molding techniques. Instead, a tool allows the inwardly extending portion 40 with the undercut 22 to be formed during the blow-molding process. The exemplary tool may include a base, a first finger, and a second finger. The first and second fingers may be movable between a molding position in which the blow-molded structure may be formed and a release position in which the blow-molded structure may be released from the tool. The first finger may include a stop and the second finger may include a stop, and the stops may help control movement of the fingers. For example, the stops may help position the fingers in the molding position and/or the release position. The fingers may also include more than one stop, which may help position the fingers in the molding position and/or the release position. The first and second fingers may include an end, such as a distal end, that extends outwardly relative to an upper surface of the base. A portion of the first and second fingers, which may include the distal ends, may be sized and configured to contact or touch the plastic during the blow-molding process. Thus, the distal ends of the fingers may help form the plastic into the desired shape during the molding process. The first and second fingers may also include another end, such as a proximal end, and the proximal end of the fingers may be disposed at least proximate a lower surface of the base. The fingers may be connected to a device, such as a motor, cam, piston, driver, and the like, and the device may help control movement of one or more of the fingers. For example, the device may move the fingers between the molding position and the release position.

The fingers may include outwardly extending portions and the outwardly extending portions may be sized and configured to form the undercuts 22 in the inwardly extending portions 40. In greater detail, an outwardly extending portion may be disposed at the distal end of each finger and the outwardly extending portions may extend in opposing directions. For example, in the molding position, the outwardly extending portions may extend in opposite directions and the outwardly extending portions may be disposed in generally the same plane. The outwardly extending portions may include a generally planar first surface and a generally planar second surface that are separated by a distance. The first and second generally planar surfaces may be generally aligned in parallel planes. The first and second generally planar surfaces, however, do not have to be aligned or disposed in generally parallel planes. For example, the first and second generally planar surfaces could be disposed at an angle depending, for example, upon the type of undercut to be formed. The outwardly extending portions may also include an outer edge or wall that extends between the first and second surfaces.

When the tool is disposed in the molding position, an upper surface of the first and second fingers and/or an upper surface of the outwardly extending portions may be generally aligned and/or disposed in the same plane. The upper surfaces of the first and second fingers and/or the upper surfaces of the outwardly extending portions may also be aligned with a portion of the base, such as an upper surface of the guide. The guide may have a generally wedge or triangular-shaped configuration and the upper surface of the first and second fingers and/or an upper surface of the outwardly extending portions may be generally aligned with the upper surface of the guide. In the molding position, the outer surfaces of the fingers proximate the base may be separated by a first distance, the outer surfaces of the fingers proximate the outwardly extending portions may be separated by a second distance, and the outermost ends or edges of the outwardly extending portions of the fingers may be separated by a third distance. The first distance may be greater than the second distance or the third distance, and this portion of the tool may form the base of the inwardly extending portion during the molding process. The second distance may be smaller than the first distance and the third distance, and the second distance may help identify the narrowest portion of the inwardly extending portion. The third distance may be smaller than the first distance and larger than the second distance, and the third distance may help identify the undercut.

When the blow-molded structure is being formed, the plastic may contact and be disposed about an upper, exterior portion of the first and second fingers, the outwardly extending portions, and a portion of the base, such as a portion of the guide and/or the upper surface of the base. Advantageously, the tool may allow the inwardly extending portion with the undercut to be created during the blow-molding process. In addition, the structure may be removed from the tool after the structure is formed without any, or substantially without any, deformation of the molded plastic structure. Significantly, the undercut can include planar surfaces and/or sharp angles, which may facilitate secure connection for components, such as fasteners, connectors, or other objects, to the blow-molded plastic structure.

Structures constructed from blow-molded plastic may have unique and distinctive properties, and some aspects of blow-molding may not be compatible with other types of molding such as injection molding, rotational molding, vacuum fuming, and the like. For example, because a blow-molded plastic structure is formed by using air or gas to inflate a parison of molten plastic, some features or structures that can be made from some types of molding processes cannot be manufactured using known blow-molding techniques. In addition, a blow-molded plastic structure is generally formed with an outer surface of the structure engaging the face of the mold and a hollow interior that is filled with pressurized gas during the molding process. Thus, blow-molded plastic structures may not be manufactured with the devices, molds, structures, and the like of other types of molding processes because of the different properties and configurations of blow-molded plastic structures. Further, because most blow-molded plastic structures include opposing walls separated by a distance and enclosing a hollow interior portion, processes or structures that may work with a single layer of material may not work with a blow-molded structure. Accordingly, after reviewing this disclosure, one skill in the art will appreciate the significant differences between the blow-molded plastic structures and methods disclosed herein, and other types of molded plastic structures and methods.

Please note that the same reference numbers may be used for convenience and/or readability. It will be appreciated that the various parts, components, surfaces, features, and the like may have different shapes, sizes, configurations, and/or arrangements. Thus, while the same reference numbers may generally identify similar parts, components, surfaces, features, and the like, it will be understood that various parts, components, surfaces, features, and the like may have other suitable shapes, sizes, configurations, and/or arrangements.

One of ordinary skill in the art may appreciate after reviewing this disclosure that the tabletops, frames, and structures disclosed herein may have a number of different aspects, features, characteristics and configurations. Further, the tabletops, frames, and structures may have any suitable number of aspects, features, characteristics and configurations depending, for example, upon the intended use of the table or other structure.

One of ordinary skill will appreciate that the structures disclosed herein may have various suitable sizes, shapes, configurations, and/or arrangements. Other exemplary configurations are shown below:

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:
1. An apparatus comprising;
a structure constructed from blow-molded plastic, the blow-molded plastic structure comprising:
an outer surface;
a projection extending outwardly from the outer surface;
a frame receiving portion at least partially disposed in the outer surface;
a first frame connecting structure with an undercut at least partially disposed in the outwardly extending projection; and
a second frame connecting structure with an undercut at least partially disposed in the frame receiving portion;
wherein the outer surface, the frame receiving portion, the first frame connecting structure, and the second frame connecting structure are integrally formed as part of a unitary, one-piece structure during the blow-molding process;
a frame connected to the blow-molded plastic structure, a first portion of the frame connected to the first frame connecting structure, a second portion of the frame connected to the second frame connecting structure.

2. The apparatus of claim 1, wherein the first portion of the frame engages a lower surface of the undercut of the first frame connecting structure; and
wherein the second portion of the frame engages a lower surface of the undercut of the second frame connecting structure.

3. The apparatus of claim 1, wherein at least a portion of the first frame connecting structure is disposed in an inner surface of the outwardly extending projection and at least a portion of the second frame connecting structure is disposed in the outer surface and in the frame receiving portion.

4. The apparatus of claim 1, wherein the first fame connecting structure comprises an outwardly extending structure with an undercut.

5. The apparatus of claim 1, wherein the second fame connecting structure comprises an inwardly extending structure with an undercut.

6. The apparatus of claim 1, wherein the frame is capable of being connected to the blow-molded plastic structure without the use of any fasteners.

7. The apparatus of claim 1, wherein a portion of the frame is inserted into the frame receiving portion and then the frame is moved within the frame receiving portion to engage the first portion of the frame with the undercut of the first frame connecting structure and to engage the second portion of the frame with the undercut of the second frame connecting structure.

8. The apparatus of claim 1, further comprising a cutout in the frame, the cutout allowing the frame to be inserted into the frame receiving portion.

9. The apparatus of claim 1, further comprising one or more outwardly extending tabs of the frame and one or more receiving portions in the tabletop, the tabs being disposed in the receiving portions when the frame is connected to the tabletop.

10. The apparatus of claim 1, wherein the first fame connecting structure comprises an outwardly extending structure with an undercut; and
wherein the second fame connecting structure comprises an inwardly extending structure with an undercut.

11. A method of connecting a frame to a blow-molded plastic structure, the method comprising:
providing a structure constructed from below-molded plastic, the blow-molded plastic structure including an outer surface, a projection extending outwardly from the outer surface, and a frame receiving portion at least partially disposed in the outer surface, the frame receiving portion including a first frame connecting structure with an undercut at least partially disposed in the outwardly extending projection and a second frame connecting structure with an undercut at least partially disposed in the frame receiving portion, the frame receiving portion, the first frame connecting structure with the undercut, and the second frame connecting structure with the undercut being integrally formed as part of a unitary, one-piece structure during a blow-molding process;
inserting at least a portion of the frame into the frame receiving portion of the blow-molded plastic structure, the frame including a cutout that is sized and configured to allow the frame to be inserted into the frame receiving portion; and
moving the frame so that a first portion of the frame contacts the first frame connecting structure and a second portion of the frame contacts the second frame connecting structure to connect the frame to the blow-molded plastic structure.

12. The method of claim 11, wherein the first portion of the frame engages a lower surface of the undercut of the first frame connecting structure; and
wherein the second portion of the frame engages a lower surface of the undercut of the second frame connecting structure.

13. The method of claim 11, wherein at least a portion of the first frame connecting structure is disposed in an inner surface of the outwardly extending projection and at least a portion of the second frame connecting structure is disposed in the outer surface.

14. The method of claim 11, wherein the first portion of the frame engages the undercut of the first frame connecting structure; and
wherein the second portion of the frame engages the undercut of the second frame connecting structure.

15. The method of claim 11, further comprising one or more outwardly extending tabs of the frame and one or more receiving portions in the tabletop, the tabs being disposed in the receiving portions when the frame is connected to the tabletop.

16. An apparatus comprising:
a blow-molded plastic structure including a hollow interior portion that is formed during the blow-molding process, the blow-molded plastic structure comprising:
an outer surface;
a projection extending outwardly from the outer surface;
a frame receiving portion disposed in the outer surface of the blow-molded plastic structure;
a first frame connecting structure with an undercut at least partially formed in the outwardly extending projection; and
a second frame connecting structure with an undercut at least partially formed in the frame receiving portion; and
a frame at least partially disposed in the frame receiving portion, the frame comprising:
a first portion of the frame disposed at least proximate the undercut of the first frame connecting structure; and
a second portion of the frame disposed at least proximate the undercut of the second frame connecting structure.

17. The apparatus of claim 16, wherein the first frame connecting structure with the undercut is formed in an outer wall of the blow-molded plastic structure during the blow-molding process; and
wherein the second frame connecting structure with the undercut is formed in an outer wall of the blow-molded plastic structure during the blow-molding process.

18. The apparatus of claim 16, wherein the first frame connecting structure with the undercut is formed in the frame receiving portion of the blow-molded plastic structure during the blow-molding process; and
wherein the second frame connecting structure with the undercut is formed in the frame receiving portion of the blow-molded plastic structure during the blow-molding process.

19. The apparatus of claim 16, wherein the first frame connecting structure comprises an outwardly extending portion with a projection and an overhang; and
wherein the second frame connecting structure comprises an inwardly extending portion with a receiving portion.

20. The apparatus of claim 16, wherein the frame receiving portion, the first frame connecting structure with the undercut, and the second frame connecting structure with the undercut are integrally formed during the blow-molding process as part of a unitary, one-piece structure; and
wherein the undercut of the first frame connecting structure and the undercut of the second frame connecting structure are formed during the blow-molding process without the removal of material after formation and without significant deformation when the blow-molded plastic structure is removed from a mold during the blow-molding process.

* * * * *